United States Patent
Li et al.

(10) Patent No.: US 11,387,885 B2
(45) Date of Patent: Jul. 12, 2022

(54) METHOD AND DEVICE FOR REPORTING ANTENNA PORT WEIGHTING VECTOR, METHOD AND DEVICE FOR ACQUIRING ANTENNA PORT WEIGHTING VECTOR, PROCESSING APPARATUS, AND STORAGE MEDIUM

(71) Applicant: ZTE Corporation, Shenzhen (CN)

(72) Inventors: Yong Li, Shenzhen (CN); Hao Wu, Shenzhen (CN); Zhaohua Lu, Shenzhen (CN); YuNgok Li, Shenzhen (CN); Yijian Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/290,325

(22) PCT Filed: Oct. 22, 2019

(86) PCT No.: PCT/CN2019/112529
§ 371 (c)(1),
(2) Date: Jun. 24, 2021

(87) PCT Pub. No.: WO2020/088307
PCT Pub. Date: May 7, 2020

(65) Prior Publication Data
US 2022/0094410 A1 Mar. 24, 2022

(30) Foreign Application Priority Data
Oct. 31, 2018 (CN) .......................... 201811288956.0

(51) Int. Cl.
*H04B 7/06* (2006.01)
*H04B 17/309* (2015.01)
*H04B 7/0456* (2017.01)

(52) U.S. Cl.
CPC ......... *H04B 7/0626* (2013.01); *H04B 7/0478* (2013.01); *H04B 7/0634* (2013.01); *H04B 17/309* (2015.01)

(58) Field of Classification Search
CPC .. H04B 7/0626; H04B 17/309; H04B 7/0478; H04B 7/0634
See application file for complete search history.

(56) References Cited

U.S. PATENT DOCUMENTS

2018/0302140 A1　10/2018　Rahman
2020/0195329 A1*　6/2020　Huang ................. H04B 7/0456
(Continued)

FOREIGN PATENT DOCUMENTS

| CN | 107888265 A | 4/2018 |
| CN | 108111200 A | 6/2018 |
| CN | 108271265 A | 7/2018 |

OTHER PUBLICATIONS

Huawei et al., "Design for Type II Feedback", 3GPP TSG RAN WG1 Meeting #88bis, R1-1705076, URL: https://www.3gpp.org/ftp/tsg_ran/WG1_RL1/TSGR1_88b/Docs, Mar. 25, 2017.
(Continued)

*Primary Examiner* — Jaison Joseph
(74) *Attorney, Agent, or Firm* — Cantor Colburn LLP

(57) ABSTRACT

Provided are a method for reporting an antenna port weighting vector. The method includes: receiving quantization mode information of weighting coefficients of second vectors configured by a second node, or reporting to a second node quantization mode information of weighting coefficients of the second vectors; and reporting to the second node the second vectors and weighting coefficients of the second vectors quantized according to the quantization mode information; where the quantization mode information includes information indicating a quantization state set; a first vector is an antenna port weighting vector and consists
(Continued)

of the second vectors; and the second vectors include at least one of the following vectors: vectors of which elements have a one-to-one correspondence with antenna ports or vectors of which elements have a one-to-one correspondence with reported frequency domain sub-bands.

20 Claims, 4 Drawing Sheets

(56) References Cited

U.S. PATENT DOCUMENTS

| | | | | |
|---|---|---|---|---|
| 2020/0336182 | A1* | 10/2020 | Faxér | H04B 7/0469 |
| 2021/0320771 | A1* | 10/2021 | Liu | H04L 5/0048 |
| 2021/0328637 | A1* | 10/2021 | Chen | H04B 7/0456 |
| 2022/0052734 | A1* | 2/2022 | Faxer | H04B 7/0478 |
| 2022/0089063 | A1* | 3/2022 | Fields | B60R 16/037 |

OTHER PUBLICATIONS

Huawei et al., "Discussion on CSI enhancement for MU-MIMO", 3GPP TSG RAN WGl Meeting #94bis, R1-1810103, URL: htts://www.3gpp.org/ftp/tsg_ran/WG1_RL1/TSGR1_94b/Docs/, Sep. 29, 2018.

International Search Report for corresponding application PCT/CN2019/112529 filed Oct. 22, 2019; dated Jan. 15, 2020.

Mediatek Inc., "CSI enhancement for MU-MIMO support", 3GHPP TSG RAN WG1 Meeting #94b, R1-1810433, URL: https://www.3gpp.org/ftp/tsg_ran/WG1_RL1/TSGR1_94b/Docs, Oct. 3, 2018.

Nokia, et al., "CSI Enhancement for MU-MIMO Support", 3GPP TSG RAN WG1 Meeting #94bis, R1-1811406, URL: https://www.3gpp.org/ftp/tsg_ran/WG1_RL1/RSGR1_94b/Docs, Sep. 29, 2018.

* cited by examiner

METHOD AND DEVICE FOR REPORTING ANTENNA PORT WEIGHTING VECTOR, METHOD AND DEVICE FOR ACQUIRING ANTENNA PORT WEIGHTING VECTOR, PROCESSING APPARATUS, AND STORAGE MEDIUM

CROSS REFERENCES TO RELATED APPLICATIONS

This is a national stage application filed under 37 U.S.C. 371 based on International Patent Application No. PCT/CN2019/112529, filed Oct. 22, 2019, which claims priority to Chinese Patent Application No. 201811288956.0 filed with the CNIPA Oct. 31, 2018, the disclosure of which are incorporated herein by reference in their entireties.

TECHNICAL FIELD

Embodiments of the present disclosure relate to, but are not limited to, the field of wireless communications.

BACKGROUND

In the wireless communication technology, the precoding technology of the multi-antenna technology is to perform precoding on transmit antennas to improve the communication performance. Generally, a transmitting side transmits one reference signal (RS) on one resource, and a receiving side measures channel state information (CSI) by using the reference signal and then feeds back the measured CSI in the form of precoding. The precoding is generally fed back in the form of precoding matrix indication (PMI) information. In order to feed back the channel state in the form of precoding with high precision, the precoding is constituted by a linear combination of multiple vectors. The precoding information is fed back in such a manner that the vectors constituting the precoding and the coefficients of these vectors are fed back. The coefficients of the vectors constituting the precoding each include a magnitude and a phase. The coefficients of the vectors constituting the precoding each are quantized in a fixed quantization mode, and the quantized coefficients are fed back.

Since the fixed quantization mode cannot be matched with the channel scenario in various cases, the reporting mode in the related art occupies a large number of reporting resources, reduces the resource utilization rate, and also reduces the reporting precision of the channel state, causing large energy consumption of the reporting terminal.

SUMMARY

The embodiments of the present disclosure provide a method and device for reporting an antenna port weighting vector, a method and device for acquiring an antenna port weighting vector, a processing apparatus, and a storage medium.

An embodiment of the present disclosure provides a method for reporting an antenna port weighting vector. The method includes: receiving quantization mode information of weighting coefficients of second vectors configured by a second node, or reporting to a second node quantization mode information of weighting coefficients of the second vectors; and reporting to the second node the second vectors and weighting coefficients of the second vectors quantized according to the quantization mode information; where the quantization mode information includes information indicating a quantization state set; a first vector is an antenna port weighting vector and consists of the second vectors; and the second vectors include at least one of the following vectors: vectors of which elements have a one-to-one correspondence with antenna ports or vectors of which elements have a one-to-one correspondence with reported frequency domain sub-bands.

An embodiment of the present disclosure provides a method for acquiring an antenna port weighting vector. The method includes: configuring for a first node quantization mode information of weighting coefficients of second vectors, or receiving quantization mode information, reported by a second node, of weighting coefficients of the second vectors, where the quantization mode information includes information indicating a quantization state set; receiving the second vectors, reported by the first node, and the weighting coefficients, reported by the first node, of the second vectors quantized according to the quantization mode information, where a first vector is an antenna port weighting vector and consists of the second vectors, and the second vectors include at least one of the following vectors: vectors of which elements have a one-to-one correspondence with antenna ports or vectors of which elements have a one-to-one correspondence with reported frequency domain sub-bands; and determining the weighting coefficients of the second vectors according to the quantization mode information and the weighting coefficients of the second vectors quantized according to the quantization mode information, and determining the first vector according to the second vectors and the quantized weighting coefficients of the second vectors.

An embodiment of the present disclosure provides a device for reporting an antenna port weighting vector. The device includes: a first configuration module, which is configured to receive quantization mode information of weighting coefficients of second vectors configured by a second node, or report to a second node quantization mode information of weighting coefficients of the second vectors; and a reporting module, which is configured to report to the second node the second vectors and weighting coefficients of the second vectors quantized according to the quantization mode information; where the quantization mode information includes information indicating a quantization state set; a first vector is an antenna port weighting vector and consists of the second vectors; and the second vectors include at least one of the following vectors: vectors of which elements have a one-to-one correspondence with antenna ports or vectors of which elements have a one-to-one correspondence with reported frequency domain sub-bands.

An embodiment of the present disclosure provides a device for acquiring an antenna port weighting vector. The device includes: a second configuration module, which is configured to configure for a first node quantization mode information of weighting coefficients of second vectors, or receive quantization mode information, reported by a second node, of weighting coefficients of the second vectors, where the quantization mode information includes information indicating a quantization state set; a second receiving module, which is configured to receive the second vectors, reported by the first node, and the weighting coefficients, reported by the first node, of the second vectors quantized according to the quantization mode information, where a first vector is an antenna port weighting vector and consists of the second vectors; and the second vectors include at least one of the following vectors: vectors of which elements have a one-to-one correspondence with antenna ports or vectors of which elements have a one-to-one correspondence with reported frequency domain sub-bands; and a second determination module, which is configured to determine the weighting coefficients of the second vectors according to the quantization mode information and the weighting coefficients of the second vectors quantized according to the quantization mode information, and determine the first vector according to the second vectors and the weighting coefficients of the second vectors.

An embodiment of the present disclosure provides an apparatus for processing an antenna port weighting vector. The apparatus includes a processor and a computer-readable storage medium, where the computer-readable storage medium is configured to store instructions which, when executed by the processor, implement any one of the methods for reporting an antenna port weighting vector or methods for acquiring an antenna port weighting vector described above.

An embodiment of the present disclosure provides a computer-readable storage medium storing a computer program which, when executed by a processor, implements steps of any one of the methods for reporting an antenna port weighting vector or methods for acquiring an antenna port weighting vector described above.

Other features and advantages of the embodiments of the present disclosure will be elaborated hereinafter in the Description, and moreover, partially become apparent from the Description, or will be understood through the implementation of the embodiments of the present disclosure. The object and other advantages of the embodiments of the present disclosure may be achieved and obtained through structures set forth in the Description, Claims and Drawings.

BRIEF DESCRIPTION OF DRAWINGS

The drawings described herein are used to provide a further understanding of solutions of the embodiments of the present disclosure and form a part of the Description. The drawings and the embodiments of the present disclosure are used to explain the solutions of the embodiments of the present disclosure and not to limit the present disclosure improperly.

DETAILED DESCRIPTION

The embodiments of the present disclosure will be described below in detail in conjunction with the drawings.

The steps illustrated in the flowcharts among the drawings may be performed by, for example, a computer system capable of executing a set of computer-executable instructions. Moreover, although logical sequences are illustrated in the flowcharts, the illustrated or described steps may be performed in sequences different from those described herein in some cases.

Figure 1:
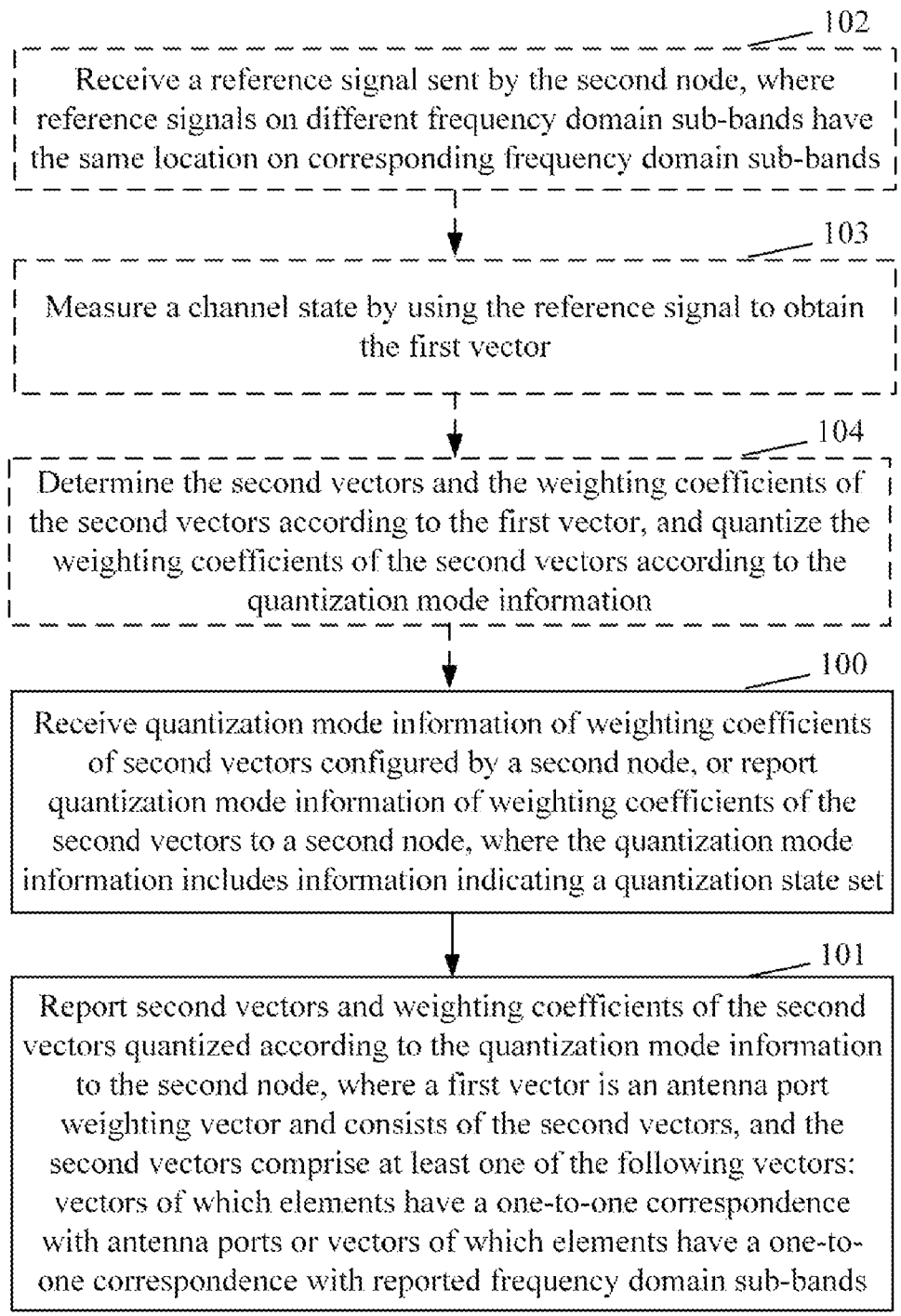
FIG. 1 is a flowchart of a method for reporting an antenna port weighting vector according to an embodiment of the present disclosure.

With reference to FIG. 1, an embodiment of the present disclosure provides a method for reporting an antenna port weighting vector. The method is applied to a first node (for example, a terminal side) and includes steps 100 and 101.

In step 100, quantization mode information of weighting coefficients of second vectors configured by a second node is received, or quantization mode information of the weighting coefficients of the second vectors is reported to the second node, where the quantization mode information includes information indicating a quantization state set.

In step 101, the second vectors and the weighting coefficients of the second vectors quantized according to the quantization mode information are reported to the second node, where a first vector is an antenna port weighting vector and consists of the second vectors, and the second vectors include at least one of the following vectors: vectors of which elements have a one-to-one correspondence with antenna ports or vectors of which elements have a one-to-one correspondence with reported frequency domain sub-bands.

In this embodiment of the present disclosure, the antenna port may be referred to as an antenna port of the first node or an antenna port of the second node.

The antenna port is used to transmit data or signals. Weighting the antenna port of the transmitting side (for example, the first node or the second node) or applying weighting coefficients to the data or signals transmitted by the antenna port of the transmitting side can increase the performance of data or signal transmission, which is generally described as applying precoding to the antenna port of the transmitting side. Each antenna port has one weighting coefficient, and the weighting coefficients on multiple antenna ports constitute one weighting coefficient vector, which is referred to as an antenna port weighting vector or precoding.

The antenna port represents an antenna. Different antenna ports is used to distinguish different antennas, representing that different channels that the transmitted data or signals pass through have different channel attributes. Antenna ports each have a number or an index number to distinguish.

There are two cases in which the first node (for example, a terminal) reports the antenna port weighting vector to the second node (for example, a base station). In one case, the weighting vector to be used by the transmit antenna port of the second node is reported by the first node. In the other case, the weighting vector to be used by the transmit antenna port of the first node is reported by the first node to the second node.

In this embodiment of the present disclosure, the weighting vector used for the antenna port consists of other vectors. For ease of description, the weighting vector used for the antenna port is referred to as a first vector, and the vector that constitutes the first vector is referred to as a second vector. The first vector consists of the second vectors. The first node reports to the second node the second vectors and coefficients required for the second vectors constituting the first vector.

In this embodiment of the present disclosure, the wireless communication always performs transmission on time-frequency resources. Performing unit structuring on frequency domain resources can improve the utilization efficiency of the frequency domain resources. For example, the frequency domain resources are subdivided into minimum frequency domain units, which are subcarriers. Multiple subcarriers form one resource block, and multiple resource blocks form one sub-band. The wireless communication may be performed on multiple sub-bands. The channel attributes may vary on different frequency domains, that is, the channel attributes are not the same on different frequency domains, but channel attributes on adjacent frequency domains have a correlation or an approximation, so the farther the distance of the frequency domains, the lower the correlation of the channel attributes. In order to save overhead while accommodating channel variations on the frequency domains, the antenna port weighting vectors are reported according to the frequency domain sub-bands, that is, the weighting vectors used by the antenna port of the transmitting side on different frequency domain sub-bands are reported, or the weighting vectors used by the antenna port of the transmitting side are reported for the frequency domain sub-bands. For example, when the second node is to transmit data on [sub-band 0, sub-band 1, . . . , sub-band N−1] of the frequency domain, the second node needs to use weighting vectors on corresponding sub-bands, the first node then needs to report to the second node the weighting vectors used by the transmit antenna port of the second node on these sub-bands. Alternatively, when the first node is to transmit data at [sub-band 0, sub-band 1, . . . sub-band N−1] of the frequency domain, the first node needs to use weighting vectors on corresponding sub-bands, the first node then needs to report to the second node the weighting vectors used by the transmit antenna ports of the first node on these sub-bands. The second node receives reports of the weighting vectors on these sub-bands to make scheduling policies.

The second vectors include at least one of the following two kinds of vectors: vectors of which elements have a one-to-one correspondence with antenna ports or vectors of which elements have a one-to-one correspondence with reported frequency domain sub-bands. For example, U is a second vector including elements $[u_0, u_1, \ldots, u_{N-1}]$, where N is a positive integer, and each of these elements corresponds to a respective antenna port. In another example, U is a second vector including elements $[u_0, u_1, \ldots, u_{N-1}]$, where N is a positive integer and each of these elements corresponds to a respective one of the reported frequency domain sub-bands.

In this embodiment of the present disclosure, the second vector may be a set of vectors, where the elements of each vector correspond to an antenna port. The first node may feed back the second vectors according to the sub-bands or may feed back the weighting coefficients of the second vectors according to the sub-bands.

Alternatively, the second vector may be a set of vectors, where the elements of each vector correspond to a sub-band. The first node may feed back the second vectors according to antenna ports or may feed back the weighting coefficients of the second vectors according to the antenna ports.

For example, the second vectors are a set of vectors including the following vectors: B(0), B(1), B(2), . . . , B(m), . . . , and B(M−1). The weighting coefficients corresponding to the vectors in the second vectors are: c(0), c(1), c(2), c(m), . . . , and c(M−1). The second vectors and their weighting coefficients are combined in a linear manner, for example, the combined first vector is the following formula.

A=c(0)×B(0)+c(1)×B(1)+c(2)×B(2), . . . , +c(m)× B(m), . . . , +c(M−1)×B(M−1), where m represents a sequence number of a vector or a sequence number of a coefficient of a vector, + represents the addition operation, and × represents the multiplication operation.

Alternatively, the first node can not only feed back second vectors of which elements correspond to antenna ports, where these second vectors are referred to as a Ba vector for ease of description, but also feed back second vectors of which elements correspond to the sub-bands, where these second vectors are referred to as a Bs vector for ease of description; and the first node can also feed back a coefficient matrix Cab of the Ba vector and the Bs vector. The Ba vector, the Bs vector, and the coefficient matrix Cab are combined into the first vector in the following manner: A=Ba×Cab×Bs' or A=Bs×Cab×Ba'.

The to-be-selected vectors of the second vectors may be pre-defined or pre-negotiated.

In another embodiment of the present disclosure, the information indicating the quantization state set includes at least one of a quantization state set index number; an element in the quantization state set; a characteristic of an element in the quantization state set; the number of quantization states included in the quantization state set; a characteristic of a quantization state included in the quantization state set; the number of bits used for reporting a quantization state in the quantization state set; direct quantization on the weighting coefficients of the second vectors; or quantization on the weighting coefficients of the second vectors by using a relative value between the different frequency domain sub-bands.

In this embodiment of the present disclosure, the weighting coefficients of the second vectors need to be quantized before being reported. The quantization mode is configured by the second node or the quantization mode is determined by the first node and then reported to the second node. The quantization mode information configured by the second node is received or the quantization mode information is reported to the second node, to obtain or select a quantization mode suitable for the channel scenario, thereby providing a sufficiently high reporting precision by using relatively small resource overhead.

In this embodiment of the present disclosure, the weighting coefficients of the second vectors are transmitted according to the quantization mode information configured by the second node or the quantization mode information reported to the second node, to obtain or select the quantization mode suitable for the channel scenario, thereby providing a sufficiently high reporting precision by using relatively small resource overhead, saving reporting resource overhead, and improving the resource utilization rate.

In another embodiment of the present disclosure, before the second vectors and the weighting coefficients of the second vectors quantized according to the quantization mode information are reported to the second node, the method further includes steps 102 to 104.

In step 102, a reference signal sent by the second node is received, where reference signals on different frequency domain sub-bands have the same location on corresponding frequency domain sub-bands.

In this embodiment of the present disclosure, the first node obtains channel information on the corresponding sub-band by measuring the reference signal on the reported frequency domain sub-band, so as to feed back the antenna port weighting vector on this sub-band.

In this embodiment of the present disclosure, only when the reference signals on different frequency domain sub-bands have the same location on the corresponding frequency domain sub-bands can the consistency of the measurement channel method on each sub-band be guaranteed, thereby eliminating errors caused by differences in the locations of the reference signals between sub-bands. The same location of the reference signals on the different frequency domain sub-bands on the corresponding frequency domain sub-bands means that the location of the sub-carrier in which the reference signal on each of the reported sub-bands is located is the same.

That the location of the reference signal on each sub-band is the same includes that there are associated reference signals on each frequency domain sub-band for the reporting, and the location of the subcarrier of the reference signal on each sub-band is the same. For example, the frequency domain sub-bands for the reporting are sub-band 0, sub-band 1, sub-band 2, and sub-band 3. Each of these sub-bands has an associated reference signal. One case of the location of the associated reference signal in the sub-band is that each resource block in the sub-band has an associated reference signal, as shown in Table 1.

TABLE 1

| Sub-band 0 | $0^{th}$ resource block of Sub-band 0 | the reference signal is on the $n^{th}$ sub-carrier and the $(n + 1)^{th}$ sub-carrier |
| --- | --- | --- |
| | $1^{st}$ resource block of Sub-band 0 | the reference signal is on the $n^{th}$ sub-carrier and the $(n + 1)^{th}$ sub-carrier |
| | $2^{nd}$ resource block of Sub-band 0 | the reference signal is on the $n^{th}$ sub-carrier and the $(n + 1)^{th}$ sub-carrier |
| | $3^{rd}$ resource block of Sub-band 0 | the reference signal is on the $n^{th}$ sub-carrier and the $(n + 1)^{th}$ sub-carrier |
| Sub-band 1 | $0^{th}$ resource block of Sub-band 1 | the reference signal is on the $n^{th}$ sub-carrier and the $(n + 1)^{th}$ sub-carrier |
| | $1^{st}$ resource block of Sub-band 1 | the reference signal is on the $n^{th}$ sub-carrier and the $(n + 1)^{th}$ sub-carrier |
| | $2^{nd}$ resource block of Sub-band 1 | the reference signal is on the $n^{th}$ sub-carrier and the $(n + 1)^{th}$ sub-carrier |
| | $3^{rd}$ resource block of Sub-band 1 | the reference signal is on the $n^{th}$ sub-carrier and the $(n + 1)^{th}$ sub-carrier |
| Sub-band 2 | $0^{th}$ resource block of Sub-band 2 | the reference signal is on the $n^{th}$ sub-carrier and the $(n + 1)^{th}$ sub-carrier |
| | $1^{st}$ resource block of Sub-band 2 | the reference signal is on the $n^{th}$ sub-carrier and the $(n + 1)^{th}$ sub-carrier |
| | $2^{nd}$ resource block of Sub-band 2 | the reference signal is on the $n^{th}$ sub-carrier and the $(n + 1)^{th}$ sub-carrier |
| | $3^{rd}$ resource block of Sub-band 2 | the reference signal is on the $n^{th}$ sub-carrier and the $(n + 1)^{th}$ sub-carrier |
| Sub-band 3 | $0^{th}$ resource block of Sub-band 3 | the reference signal is on the $n^{th}$ sub-carrier and the $(n + 1)^{th}$ sub-carrier |
| | $1^{st}$ resource block of Sub-band 3 | the reference signal is on the $n^{th}$ sub-carrier and the $(n + 1)^{th}$ sub-carrier |
| | $2^{nd}$ resource block of Sub-band 3 | the reference signal is on the $n^{th}$ sub-carrier and the $(n + 1)^{th}$ sub-carrier |
| | $3^{rd}$ resource block of Sub-band 3 | the reference signal is on the $n^{th}$ sub-carrier and the $(n + 1)^{th}$ sub-carrier |

Another case is that the associated reference signal is in part of resources of the sub-band, as shown in Table 2.

TABLE 2

| Sub-band 0 | $0^{th}$ resource block of Sub-band 0 | the reference signal is on the $n^{th}$ sub-carrier and the $(n + 1)^{th}$ sub-carrier |
| --- | --- | --- |
| | $1^{st}$ resource block of Sub-band 0 | the reference signal does not exist |
| | $2^{nd}$ resource block of Sub-band 0 | the reference signal is on the $n^{th}$ sub-carrier and the $(n + 1)^{th}$ sub-carrier |
| | $3^{rd}$ resource block of Sub-band 0 | the reference signal does not exist |
| Sub-band 1 | $0^{th}$ resouce block of Sub-band 1 | the reference signal is on the $n^{th}$ sub-carrier and the $(n + 1)^{th}$ sub-carrier |
| | 1st resource block of Sub-band 1 | the reference signal does not exist |
| | $2^{nd}$ resource block of Sub-band 1 | the reference signal is on the $n^{th}$ sub-carrier and the $(n + 1)^{th}$ sub-carrier |
| | $3^{rd}$ resource block of Sub-band 1 | the reference signal does not exist |
| Sub-band 2 | $0^{th}$ resource block of Sub-band 2 | the reference signal is on the $n^{th}$ sub-carrier and the $(n + 1)^{th}$ sub-carrier |
| | $1^{st}$ resource block of Sub-band 2 | the reference signal does not exist |
| | $2^{nd}$ resource block of Sub-band 2 | the reference signal is on the $n^{th}$ sub-carrier and the $(n + 1)^{th}$ sub-carrier |
| | $3^{rd}$ resource block of Sub-band 2 | the reference signal does not exist |
| Sub-band 3 | $0^{th}$ resource block of Sub-band 3 | the reference signal is on the $n^{th}$ sub-carrier and the $(n + 1)^{th}$ sub-carrier |
| | $1^{st}$ resource block of Sub-band 3 | the reference signal does not exist |

TABLE 2-continued

| | |
|---|---|
| $2^{nd}$ resource block of Sub-band 3 | the reference signal is on the $n^{th}$ sub-carrier and the $(n + 1)^{th}$ sub-carrier |
| $3^{rd}$ resource block of Sub-band 3 | the reference signal does not exist |

In step 103, a channel state is measured by using the reference signal to obtain the first vector.

In step 104, the second vectors and the weighting coefficients of the second vectors are determined according to the first vector, and the weighting coefficients of the second vectors are quantized according to the quantization mode information.

In this embodiment of the present disclosure, in principle, the weighting coefficient of the vector with the strongest power in the second vectors may be any value. In order to save the reporting resource overhead and improve the resource utilization rate, the weighting coefficient of the vector with the strongest power in the second vectors may be agreed to be a first preset value (for example, 1). In this manner, it is not necessary to report the weighting coefficient of the vector with the strongest power, but only the index number or location of the vector with the strongest power needs to be reported. When the second node combines the first vector, the value of the weighting coefficient of the vector with the strongest power is taken as the first preset value to participate in the operation.

In another embodiment of the present disclosure, the step in which the second vectors and the weighting coefficients of the second vectors quantized according to the quantization mode information are reported to the second node includes: preferentially reporting, according to importance of each of the second vectors, to the second node a second vector with high importance and a weighting coefficient of the second vector with high importance quantized according to the quantization mode information.

For example, the phases of the weighting coefficients of the second vectors may be reported in order of magnitude values from large to small. Since the reporting of the phases of the weighting coefficients of the second vectors requires more resources and costs time, if the phase of a weighting coefficient with a larger magnitude value is reported first, the second node can estimate and use the first vector in advance with less waiting time without obtaining the phases of all the weighting coefficients. In another example, when the reporting resources are insufficient to report the phases of all the weighting coefficients, the phases of weighting coefficients with larger magnitude values can be reported first, and the phases of weighting coefficients with smaller magnitude values can be discarded, because the weighting coefficients with smaller magnitude values and their corresponding second vectors have few contributions to the composition of the first vector.

In another embodiment of the present disclosure, the weighting coefficients of the second vectors quantized according to the quantization mode information are reported according to at least one of the information described below.

The information is a vector whose weighting coefficient is a second preset value in the second vectors. The second preset value includes at least one of 0 or 1, and the vector whose weighting coefficient is the second preset value is reported through any one of an index number of the vector whose weighting coefficient is the second preset value, a location in which the vector whose weighting coefficient is the second preset value is located, a numerical value having a mapping relationship with the index number of the vector whose weighting coefficient is the second preset value, or a numerical value having a mapping relationship with the location in which the vector whose weighting coefficient is the second preset value is located.

The information is a vector whose weighting coefficient has a maximum magnitude in the second vectors. The vector whose weighting coefficient has the maximum magnitude is reported through any one of an index number of the vector whose weighting coefficient has the maximum magnitude, a location in which the vector whose weighting coefficient has the maximum magnitude is located, a numerical value having a mapping relationship with the index number of the vector whose weighting coefficient has the maximum magnitude, or a numerical value having a mapping relationship with the location in which the vector whose weighting coefficient has the maximum magnitude is located.

The information is a vector with the strongest power in the second vectors. The vector with the strongest power is reported through any one of an index number of the vector with the strongest power, a location in which the vector with the strongest power is located, a numerical value having a mapping relationship with the index number of the vector with the strongest power, or a numerical value having a mapping relationship with the location in which the vector with the strongest power is located.

The information is an index number of a frequency domain sub-band or a location in which the frequency domain sub-band is located, and weighting coefficients of the second vectors on the frequency domain sub-band quantized according to the quantization mode information or a relative value of the quantized weighting coefficients of the second vectors on the frequency domain sub-band. It is to be noted that the index numbers or locations of the sub-bands corresponding to the second vectors and the weighting coefficients of the second vectors quantized according to the quantization mode information on the corresponding sub-bands are reported so that the second node understands the correspondence between the reported weighting coefficients of the second vectors quantized according to the quantization mode information and the sub-bands, for example, only the weighting coefficients of second vectors quantized according to the quantization mode information on part of the sub-bands are reported, and the index numbers of these sub-bands are reported to save overhead, where the reporting of the index numbers of these sub-bands enables the second node to understand the sub-bands corresponding to the reported weighting coefficients of the second vectors quantized according to the quantization mode information, in another example, the weighting coefficients of the second vectors on the sub-bands are reported according to the magnitude values, and the index numbers of these sub-bands are reported, where the reporting of the index numbers of the sub-bands enables the second node to understand the sub-bands corresponding to the reported weighting coefficients of the second vectors quantized according to the quantization mode information, in another example, the weighting coefficients of the second vectors quantized according to the quantization mode information on the sub-bands are reported according to phase values, and the index numbers of these sub-bands are reported, where the reporting of the index numbers of the sub-bands enables the second node to understand the sub-bands corresponding to the reported weighting coefficients of the second vectors quantized according to the quantization mode information, where the weighting coefficients of the second vectors quantized according to the quantization mode information herein are referred to as direct values of the weighting coefficients of the second vectors quantized according to the quantization mode information, and also referred to as relative values of the weighting coefficients of the second vectors quantized according to the quantization mode information;

The information is a weighting coefficient of a second vector on a frequency domain sub-band group quantized according to the quantization mode information. For example, the frequency domain sub-bands are divided into S groups, and the weighting coefficients of the second vectors quantized according to the quantization mode information are fed back according to groups, where S is a positive integer, for example, the frequency domain sub-bands are divided into 2 groups, a group of weighting coefficients of the second vectors quantized according to the quantization mode information is fed back for a first group, and another group of weighting coefficients of the second vectors quantized according to the quantization mode information is fed back for a second group, for example, the frequency domain sub-bands are divided into 3 groups, a group of weighting coefficients of the second vectors quantized according to the quantization mode information is fed back for a first group, another group of weighting coefficients of the second vectors quantized according to the quantization mode information is fed back for a second group, and another group of weighting coefficients of the second vectors quantized according to the quantization mode information is fed back for a third group, for example, the frequency domain sub-bands are divided into 4 groups, a group of weighting coefficients of the second vectors quantized according to the quantization mode information is fed back for a first group, another group of weighting coefficients of the second vectors quantized according to the quantization mode information is fed back for a second group, another group of weighting coefficients of the second vectors quantized according to the quantization mode information is fed back for a third group, and another group of weighting coefficients of the second vectors quantized according to the quantization mode information is fed back for a fourth group, and in this manner, since a group of frequency domain sub-bands often includes multiple sub-bands, the feedback of the weighting coefficients of the second vectors quantized according to the quantization mode information according to the frequency domain sub-band groups can save the overhead, and the simultaneous feedback of the weighting coefficients of multiple second vectors quantized according to the quantization mode information can reduce the error caused by the excessive bandwidth;

The information is magnitudes of the weighting coefficients of the second vectors quantized according to the quantization mode information.

The information is phases of the weighting coefficients of the second vectors quantized according to the quantization mode information.

In this embodiment of the present disclosure, the feedback of the weighting coefficients is generally referred to as the feedback of the magnitudes and phases of the coefficients. Since there are some vectors whose weighting coefficients are a second preset value (for example, 0, or their weighting coefficients are extremely small and thus are regarded as 0) in the second vectors, only the index numbers of the vectors whose weighting coefficients are the second preset value or the locations in which these vectors are located need to be fed back, and the magnitudes and the phases of the weighting coefficients of these vectors need not be fed back one by one, thereby saving the overhead. Meanwhile, when the second node combines the first vector, these vectors whose weighting coefficients are 0 may not need to participate in the combination operation or may simplify the combination operation, thereby simplifying the coefficient complexity.

The vectors whose weighting coefficients have the maximum magnitude or the vectors with the strongest power can be used as reference second vectors to normalize the weighting coefficients of other second vectors, thereby reducing the accumulated error between the weighting coefficients of the second vectors.

In this embodiment of the present disclosure, the feedback of the index numbers of the above-mentioned vectors may be the feedback of index numbers of to-be-selected vectors or the feedback of index numbers of vectors in the selected vector set. For example, the index number of a vector whose index number is required to be fed back in the to-be-selected vectors is D(i), and the index number of this vector in the selected vector set is Y(k). The first node may feed back the index number D(i) in the to-be-selected vectors or the index number Y(k) in the selected vector set. Alternatively, the location of this vector in the to-be-selected vectors or the location of this vector in the selected vector set is fed back in a manner of bit mapping.

In another embodiment of the present disclosure, the magnitudes or the phases of the weighting coefficients of the second vectors quantized according to the quantization mode information are reported according to at least one of the following information: quantization states of the magnitudes or the phases, or a quantization state of a relative value of the magnitudes or the phases of the second vectors between the different frequency domain sub-bands.

In this embodiment of the present disclosure, channel attributes between sub-bands have a correlation, and since the dynamic range of the relative value of the weighting coefficients of the second vectors between sub-bands is smaller than the dynamic range of the values of the weighting coefficients of the second vectors on the sub-bands, the quantization state of the relative value with the small dynamic range is fed back, thereby saving the overhead.

The weighting coefficient consists of a phase and a magnitude, that is, the weighting coefficient includes two parts: one part is the phase and the other part is the magnitude. For example, the weighting coefficient of the sub-band m is $A_m e^{j\varphi_m}$, where $A_m$ is the magnitude, and $\varphi_m$ is the phase, and the weighting coefficient of the sub-band n is $A_n e^{j\varphi_n}$, where $A_n$ is the magnitude, and $\varphi_n$ is the phase. The relative value of the magnitude of the weighting coefficient of the sub-band n with respect to the sub-band m is $$\frac{A_n}{A_m},$$

and the relative value of the phase of the weighting coefficient of the sub-band n with respect to the sub-band m is $\varphi_n - \varphi_m$. The first node selects a quantization state from a quantization state set SA of the magnitudes for $$\frac{A_n}{A_m},$$

selects a quantization state from a quantization state set $S_p$ of the phases for $\varphi_n-\varphi_m$, and then preforms the reporting, where the sub-band m is a reference sub-band. For example, the weighting coefficient of the sub-band 0 is $$0.8e^{\frac{j\pi}{2}},$$

where 0.8 is the magnitude, and $$\frac{\pi}{2}$$

is the phase. The weighting coefficient of the sub-band 1 is $0.7e^{j3\pi/4}$. A quantization state is selected from a quantization state set $$\left\{1, \frac{\sqrt{2}}{2}\right\}$$

of the magnitudes for the relative value $$\frac{0.7}{0.8}$$

of the magnitude of the weighting coefficient of the sub-band 1 with respect to the sub-band 0, for example, the selected quantization state is 0, and then the reporting is performed; a quantization state is selected from a quantization state set $$\left\{0, \frac{\pi}{4}\right\}$$

of the phases for the relative value $$\frac{3\pi}{4} - \frac{\pi}{2}$$

of the phase of the weighting coefficient of the sub-band 1 with respect to the sub-band 0, for example, the selected quantization state is $$\frac{\pi}{4},$$

and then the reporting is performed; where the sub-band 0 is a reference sub-band.

The reference value of the relative value of the magnitudes or the phases includes any one of: a magnitude or a phase of a reference sub-band, or a quantization state of the magnitude or the phase of the reference sub-band.

For example, the weighting coefficient of the sub-band m is $A_m e^{j\varphi_m}$, where $A_m$ is the magnitude, and $\varphi_m$ is the phase. The magnitude value of the weighting coefficient reported for the reference sub-band m is $A_m{}'$, and the phased value of the reported weighting coefficient is $\varphi_m{}'$. The weighting coefficient of the sub-band n $A_n e^{j\varphi_n}$, where $A_n$ is the magnitude, and $\varphi_n$ is the phase. The relative value of the report value of the magnitude of the weighting coefficient of the sub-band n with respect to the reference sub-band m is $$\frac{A_n}{A_m'},$$

that is, the reference value of the relative value of the magnitude of the weighting coefficient of the sub-band n is the report value of the magnitude of the weighting coefficient of the sub-band m. The relative value of the report value of the phase of the weighting coefficient of the sub-band n with respect to the sub-band m is $\varphi_n-\varphi_m{}'$, that is, the reference value of the relative value of the phase of the weighting coefficient of the sub-band n is the report value of the phase of the weighting coefficient of the sub-band m. The first node selects a quantization state from a quantization state set $S_A$ of the magnitudes for $$\frac{A_n}{A_m'},$$

selects a quantization state from a quantization state set $S_p$ of the phases for $\varphi_n-\varphi_m{}'$, and then preforms the reporting. For example, the weighting coefficient of the sub-band 0 is $$0.8e^{\frac{j5\pi}{2}},$$

where 0.8 is the magnitude, and $$\frac{5\pi}{2}$$

is the phase. The magnitude value of the weighting coefficient reported for the sub-band 0 is 1, and the phase value of the reported weighting coefficient is $$\frac{\pi}{2}.$$

The weighting coefficient of the sub-band 1 is $$0.7e^{\frac{j3\pi}{4}}.$$

A quantization state is selected from a quantization state set $$\left\{1, \frac{\sqrt{2}}{2}\right\}$$

of the magnitudes for the relative value $$\frac{0.7}{1}$$

of the report value of the magnitude of the weighting coefficient of the sub-band 1 with respect to the sub-band 0, for example, the selected quantization state is $$\left\{1, \frac{\sqrt{2}}{2}\right\},$$

and then the reporting is performed. A quantization state is selected from a quantization state set $$\left\{0, \frac{\pi}{4}\right\}$$

of the phases for the relative value $$\frac{3\pi}{4} - \frac{\pi}{2}$$

of the report value of the phase of the weighting coefficient of the sub-band 1 with respect to the sub-band 0, for example, the selected quantization state is $$\frac{\pi}{4},$$

and then the reporting is performed.

In this embodiment of the present disclosure, the reference value of the relative value is the reported value (that is, the quantization state of the magnitude or the phase of the reference sub-band), which reduces the error of the finally formed target report value, thereby improving the precision of the target report value. Since the quantization usually generates errors, if the reference value of the relative value is not the report value, the target report value includes the quantization error of the reference value and the quantization error of the relative value. The reference value of the relative value adopts the report value, which cancels out the quantization error of the reference value, so there is only the quantization error of the relative value, thereby improving the error of the target report value. The report value of the magnitude or the report value of the phase of the weighting coefficient of the sub-band n or the sub-band 1 in the above-mentioned examples is the target report value.

In another embodiment of the present disclosure, the quantization states of the magnitudes or the phases are reported through any one of the following information: a quantization state set of the magnitudes or the phases, a quantization state in the quantization state set, and a vector or a vector group using the quantization state in the second vectors; a quantization state set of the magnitudes or the phases, a quantization state in the quantization state set, vectors using the quantization state set in the second vector, and a vector, in the vectors using the quantization state set, using the quantization state; a quantization state set of the magnitudes or the phases, a quantization state in the quantization state set, a vector group using the quantization state set in the second vectors, and a vector using the quantization state in the vector group; the quantization states of the magnitudes or the phases, and a vector or a vector group, in the second vectors, using the quantization state of the magnitudes or the phases; the quantization states of the magnitudes or the phases, and a sub-band or a sub-band set using the quantization states of the magnitudes or the phases; a quantization state set of the magnitudes or the phases, a quantization state in the quantization state set, sub-bands using the quantization state set, and a sub-band, in the sub-bands using the quantization state set, using the quantization state; or a quantization state set of the magnitudes or the phases, a quantization state in the quantization state set, a sub-band group using the quantization state set, and a sub-band, in the sub-band group, using the quantization state.

In this embodiment of the present disclosure, the reporting of the quantization state of the phases or the magnitudes of the weighting coefficient is to select an element from a quantization state set having a limited number of elements as the phase or the magnitude of the weighting coefficient. The reported content may be the index number of the element in the quantization state set or the location of the element in the quantization state set. One element in the quantization state set is one quantization state, and a selected element is a quantization state corresponding to a phase or a magnitude. For example, an element is selected from the quantization state set $$\left\{1, \frac{\sqrt{2}}{2}\right\}$$

for the magnitude value and then the reporting is performed, or an element is selected from the quantization state set $$\left\{0, \frac{\pi}{2}\right\}$$

for the phase value and then the reporting is performed.

There may be multiple quantization state sets, and the first node reports the used or selected quantization state sets, thereby facilitating the adaptation to the channel state, saving the reporting resource overhead, and improving the reporting precision. For example, the multiple quantization state sets may be predefined or negotiated, and the first node reports the selected or used quantization state sets. For example, there are examples of quantization state sets of the magnitudes in Tables 3 to 7.

TABLE 3

| Quantization state set 1 of the magnitudes | |
|---|---|
| Index numbers of elements in the quantization state set | Elements in the quantization state set |
| 0 | 0 |
| 1 | $\sqrt{\frac{1}{64}}$ |

TABLE 3-continued

Quantization state set 1 of the magnitudes

| Index numbers of elements in the quantization state set | Elements in the quantization state set |
|---|---|
| 2 | $\sqrt{\frac{1}{32}}$ |
| 3 | $\sqrt{\frac{1}{16}}$ |
| 4 | $\sqrt{\frac{1}{8}}$ |
| 5 | $\sqrt{\frac{1}{4}}$ |
| 6 | $\sqrt{\frac{1}{2}}$ |
| 7 | 1 |

TABLE 4

Quantization state set 2 of the magnitudes

| Index numbers of elements in the quantization state set | Elements in the quantization state set |
|---|---|
| 0 | 0 |
| 1 | $\sqrt{\frac{1}{16}}$ |
| 2 | $\sqrt{\frac{1}{4}}$ |
| 3 | 1 |

TABLE 5

Quantization state set 3 of the magnitudes

| Index numbers of elements in the quantization state set | Elements in the quantization state set |
|---|---|
| 0 | 0 |
| 1 | $\sqrt{\frac{1}{4}}$ |
| 2 | $\sqrt{\frac{1}{2}}$ |
| 3 | 1 |

TABLE 6

Quantization state set 4 of the magnitudes

| Index numbers of elements in the quantization state set | Elements in the quantization state set |
|---|---|
| 0 | $\sqrt{\frac{1}{8}}$ |
| 1 | $\sqrt{\frac{1}{4}}$ |
| 2 | $\sqrt{\frac{1}{2}}$ |
| 3 | 1 |

TABLE 7

Quantization state set 5 of the magnitudes

| Index numbers of elements in the quantization state set | Elements in the quantization state set |
|---|---|
| 0 | $\sqrt{\frac{1}{2}}$ |
| 1 | 1 |

As shown in Tables 3 to 7, the quantization state set 1 of the magnitudes includes 8 elements or quantization states, among which one specific quantization state may be represented by using 3 bits. For example, the index number of one quantization state may be represented by using 3 bits to report the quantization state of the magnitude value. The quantization state set 2, 3, or 4 of the magnitudes includes 4 elements or quantization states, among which one specific quantization state may be represented by using 2 bits. For example, the index number of one quantization state may be represented by using 2 bits to report the quantization state of the magnitude value. The quantization state set 5 of the magnitudes includes 2 elements or quantization states, among which one specific quantization state may be represented by using 1 bit. For example, the index number of one quantization state may be represented by using 1 bit to report the quantization state of the magnitude value.

There are examples of quantization state sets of the phases in Tables 8 to 12.

TABLE 8

Quantization state set 1 of the phases

| Index numbers of elements in the quantization state set | Elements in the quantization state set |
|---|---|
| 0 | 0 |
| 1 | $\frac{\pi}{4}$ |
| 2 | $\frac{\pi}{2}$ |
| 3 | $\frac{3\pi}{4}$ |

TABLE 8-continued

Quantization state set 1 of the phases

| Index numbers of elements in the quantization state set | Elements in the quantization state set |
|---|---|
| 4 | $\pi$ |
| 5 | $\frac{5\pi}{4}$ |
| 6 | $\frac{3\pi}{2}$ |
| 7 | $\frac{7\pi}{4}$ |

TABLE 9

Quantization state set 2 of the phases

| Index numbers of elements in the quantization state set | Elements in the quantization state set |
|---|---|
| 0 | 0 |
| 1 | $\frac{\pi}{2}$ |
| 2 | $\pi$ |
| 3 | $\frac{3\pi}{2}$ |

TABLE 10

Quantization state set 3 of the phases

| Index numbers of elements in the quantization state set | Elements in the quantization state set |
|---|---|
| 0 | 0 |
| 1 | $\frac{\pi}{4}$ |
| 2 | $\pi$ |
| 3 | $\frac{7\pi}{4}$ |

TABLE 11

Quantization state set 4 of the phases

| Index numbers of elements in the quantization state set | Elements in the quantization state set |
|---|---|
| 0 | 0 |
| 1 | $\frac{3\pi}{4}$ |
| 2 | $\pi$ |
| 3 | $\frac{5\pi}{4}$ |

TABLE 12

Quantization state set 5 of the phases

| Index numbers of elements in the quantization state set | Elements in the quantization state set |
|---|---|
| 0 | 0 |
| 1 | $\pi$ |

As shown in Tables 8 to 12, the quantization state set 1 of the phases includes 8 elements or quantization states, among which one specific quantization state may be represented by using 3 bits. For example, the index number of one quantization state may be represented by using 3 bits to report the quantization state of the phase value. The quantization state set 2, 3, or 4 of the phases includes 4 elements or quantization states, among which one specific quantization state may be represented by using 2 bits. For example, the index number of one quantization state may be represented by using 2 bits to report the quantization state of the phase value. The quantization state set 5 of the phases includes 2 elements or quantization states, among which one specific quantization state may be represented by using 1 bit. For example, the index number of one quantization state may be represented by using 1 bit to report the quantization state of the phase value.

In a case where the second vectors include one or more vectors, the same quantization state set may be reported for all the second vectors, that is, one quantization state set that is applicable to all vectors in the second vectors is reported. For example, a quantization state set of the magnitudes that is applicable to the magnitudes of weighting coefficients of all vectors in the second vectors is reported, and a quantization state set of the phases that is applicable to the phases of weighting coefficients of all vectors in the second vectors is reported. Alternatively, a quantization state set of the magnitudes or a quantization state set of the phases is reported for each vector in the second vectors, respectively. Alternatively, the vectors in the second vectors are divided into multiple groups, each group includes one or more vectors, and a quantization state set of the magnitudes or a quantization state set of the phases is reported according to the groups, respectively; that is, one group corresponds to a quantization state set of the magnitudes or a quantization state set of the phases. The groups of the second vectors may be divided into different groups according to the power or magnitudes, and a quantization state set of the phases may be reported according to the groups, respectively.

One or more quantization state sets of the magnitudes are reported, where the one or more quantization state sets of the magnitudes are associated with a group of vectors in the second vectors, respectively, that is, at least one quantization state set of the magnitudes corresponds to a group of vectors in the second vectors, that is, this group of vectors is applicable to the corresponding quantization state sets of the magnitudes. Alternatively, one or more quantization state sets of the phases are reported, where the one or more quantization state sets of the phases are associated with a group of vectors in the second vectors, respectively, that is, at least one quantization state set of the phases corresponds to a group of vectors in the second vectors, that is, this group of vectors is applicable to the corresponding quantization state sets of the phases.

One or more quantization states of the magnitudes are reported, where the one or more quantization states of the magnitudes are associated with a group of vectors in the second vectors, respectively, that is, at least one quantization state of the magnitudes corresponds to a group of vectors in the second vectors, that is, this group of vectors is applicable to the corresponding quantization states of the magnitudes. Alternatively, one or more quantization state of the phases are reported, where the one or more quantization states of the phases are associated with a group of vectors in the second vectors, respectively, that is, at least one quantization state of the phases corresponds to a group of vectors in the second vectors, that is, this group of vectors is applicable to the corresponding quantization states of the phases.

One or more quantization states of the magnitudes are reported, where the one or more quantization states of the magnitudes are associated with a group of sub-bands in the sub-bands, respectively, that is, at least one quantization state of the magnitudes corresponds to a group of sub-bands in the sub-bands, that is, this group of sub-bands is applicable to the corresponding quantization states of the magnitudes. Alternatively, one or more quantization state of the phases are reported, where the one or more quantization states of the phases are associated with a group of sub-bands in the sub-bands, respectively, that is, at least one quantization state of the phases corresponds to a group of sub-bands in the sub-bands, that is, this group of sub-bands is applicable to the corresponding quantization states of the phases.

One or more quantization state sets of the magnitudes are reported, where the one or more quantization state sets of the magnitudes are associated with a group of sub-bands in the sub-bands, respectively, that is, at least one quantization state set of the magnitudes corresponds to a group of sub-bands in the second vectors, that is, this group of sub-bands is applicable to the corresponding quantization state sets of the magnitudes. Alternatively, one or more quantization state sets of the phases are reported, where the one or more quantization state sets of the phases are associated with a group of sub-bands in the sub-bands, respectively, that is, at least one quantization state set of the phases corresponds to a group of sub-bands in the second vectors, that is, this group of sub-bands is applicable to the corresponding quantization state sets of the phases.

In another embodiment of the present disclosure, the quantization state of the relative value of the magnitudes or the phases is reported through any one of the information described below.

The information is a quantization state set of the relative value of the magnitudes or the phases, a quantization state in the quantization state set, and a vector or a vector group using the quantization state in the second vectors.

The information is a quantization state set of the relative value of the magnitudes or the phases, a quantization state in the quantization state set, vectors using the quantization state set in the second vectors, and a vector, in the vectors using the quantization state set, using the quantization state.

The information is a quantization state set of the relative value of the magnitudes or the phases, a quantization state in the quantization state set, a vector group using the quantization state set in the second vectors, and a vector using the quantization state in the vector group.

The information is a quantization state of the relative value of the magnitudes or the phases, and a vector or a vector group, in the second vectors, using the quantization state of the relative value of the magnitudes or the phases.

The information is a quantization state of the relative value of the magnitudes or the phases, and a sub-band or a sub-band set using the quantization state of the relative value of the magnitudes or the phases.

The information is a quantization state set of the relative value of the magnitudes or the phases, a quantization state in the quantization state set, sub-bands using the quantization state set, and a sub-band, in the sub-bands using the quantization state set, using the quantization state.

The information is a quantization state set of the relative value of the magnitudes or the phases, a quantization state in the quantization state set, a sub-band group using the quantization state set, and a sub-band, in the sub-band group, using the quantization state.

The information is an index number of a sub-band in which a quantization state of the relative value of the magnitudes or the phases is a third preset value or a location in which the sub-band is located, and the third preset value includes 0. For example, the index number of the sub-band or the location in which the sub-band is reported, and the quantization state of the relative value of the phase of the weighting coefficient of the second vector corresponding to the sub-band is 0 by default or default is 0. In another example, the index number of the sub-band or the location in which the sub-band is located is reported, and that the quantization state of the relative value of the phase of the weighting coefficient of the second vector corresponding to the sub-band is 0 is reported, and in this manner, that the quantization state is 0 is not reported or that the quantization states corresponding to multiple sub-bands are 0 is reported only once, thereby saving the overhead.

The information alternatively is an index number of a sub-band in which a quantization state of the relative value of the magnitudes or the phases remains unchanged or a location in which the sub-band is located. For example, the index number of the sub-band or the location in which the sub-band is reported, and the quantization state of the relative value of the phase of the weighting coefficient of the second vector corresponding to the sub-band remains unchanged by default or default is remaining unchanged, in another example, the index number of the sub-band or the location in which the sub-band is located is reported, and that the quantization state of the relative value of the phase of the weighting coefficient of the second vector corresponding to the sub-band remains unchanged is reported, and in this manner, the quantization state is not reported or that the quantization states corresponding to multiple sub-bands remain unchanged is reported only once, thereby saving the overhead.

In this embodiment of the present disclosure, the reporting of the quantization state of the relative value of the phases or the magnitudes of the weighting coefficient is to select an element from a quantization state set having a limited number of elements as the relative value of the phases or the relative value of the magnitudes of the weighting coefficient. The reported content may be the index number of the element in the quantization state set or the location of the element in the quantization state set. One element in the quantization state set is one quantization state, and a selected element is a quantization state corresponding to the relative value of a phase or a magnitude. For example, an element is selected from the quantization state set $$\left\{1, \frac{\sqrt{2}}{2}\right\}$$

for the relative value of the magnitude value and then the reporting is performed, or an element is selected from the quantization state set $$\left\{0, \frac{\pi}{2}\right\}$$

for the relative value of the phase value and then the reporting is performed.

There may be multiple quantization state sets, and the first node reports the used or selected quantization state sets, thereby facilitating the adaptation to the channel state, saving the reporting resource overhead, and improving the reporting precision. For example, the multiple quantization state sets may be predefined or negotiated, and the first node reports the selected or used quantization state sets. For example, there are examples of quantization state sets of the magnitudes in Tables 13 and 14.

TABLE 13

Quantization state set 1 of the relative value of the magnitudes

| Index numbers of elements in the quantization state set | Elements in the quantization state set |
|---|---|
| 0 | $\sqrt{\frac{1}{8}}$ |
| 1 | $\sqrt{\frac{1}{4}}$ |
| 2 | $\sqrt{\frac{1}{2}}$ |
| 3 | 1 |

TABLE 14

Quantization state set 2 of the relative value of the magnitudes

| Index numbers of elements in the quantization state set | Elements in the quantization state set |
|---|---|
| 0 | $\sqrt{\frac{1}{2}}$ |
| 1 | 1 |

As shown in Tables 13 and 14, the quantization state set 1 of the relative value of the magnitudes includes 4 elements or quantization states, among which one specific quantization state may be represented by using 2 bits. For example, the index number of one quantization state is represented by using 2 bits to report the quantization state of the relative value of the magnitude. The quantization state set 2 of the relative value of the magnitudes includes 2 elements or quantization states, among which one specific quantization state may be represented by using 1 bit. For example, the index number of one quantization state is represented by using 1 bit to report the quantization state of the relative value of the magnitude.

There are examples of quantization state sets of the relative value of the phases in Tables 15 to 25.

TABLE 15

Quantization state set 1 of the relative value of the phases

| Index numbers of elements in the quantization state set | Elements in the quantization state set |
|---|---|
| 0 | 0 |
| 1 | $\frac{\pi}{4}$ |
| 2 | $\frac{\pi}{2}$ |
| 3 | $\frac{3\pi}{4}$ |

TABLE 16

Quantization state set 2 of the relative value of the phases

| Index numbers of elements in the quantization state set | Elements in the quantization state set |
|---|---|
| 0 | 0 |
| 1 | $-\frac{\pi}{4}$ |
| 2 | $-\frac{\pi}{2}$ |
| 3 | $-\frac{3\pi}{4}$ |

TABLE 17

Quantization state set 3 of the relative value of the phases

| Index numbers of elements in the quantization state set | Elements in the quantization state set |
|---|---|
| 0 | $-\frac{\pi}{4}$ |
| 1 | 0 |
| 2 | $\frac{\pi}{4}$ |
| 3 | $\frac{\pi}{2}$ |

TABLE 18

Quantization state set 4 of the relative value of the phases

| Index numbers of elements in the quantization state set | Elements in the quantization state set |
|---|---|
| 0 | $\frac{\pi}{4}$ |
| 1 | 0 |

TABLE 18-continued

Quantization state set 4 of the relative value of the phases

| Index numbers of elements in the quantization state set | Elements in the quantization state set |
|---|---|
| 2 | $-\frac{\pi}{4}$ |
| 3 | $-\frac{\pi}{2}$ |

TABLE 19

Quantization state set 5 of the relative value of the phases

| Index numbers of elements in the quantization state set | Elements in the quantization state set |
|---|---|
| 0 | 0 |
| 1 | $\frac{\pi}{2}$ |

TABLE 20

Quantization state set 6 of the relative value of the phases

| Index numbers of elements in the quantization state set | Elements in the quantization state set |
|---|---|
| 0 | 0 |
| 1 | $-\frac{\pi}{2}$ |

TABLE 21

Quantization state set 7 of the relative value of the phases

| Index numbers of elements in the quantization state set | Elements in the quantization state set |
|---|---|
| 0 | 0 |
| 1 | $\frac{\pi}{4}$ |

TABLE 22

Quantization state set 8 of the relative value of the phases

| Index numbers of elements in the quantization state set | Elements in the quantization state set |
|---|---|
| 0 | 0 |
| 1 | $-\frac{\pi}{4}$ |

TABLE 23

Quantization state set 9 of the relative value of the phases

| Index numbers of elements in the quantization state set | Elements in the quantization state set |
|---|---|
| 0 | 0 |
| 1 | $\frac{\pi}{8}$ |

TABLE 24

Quantization state set 10 of the relative value of the phases

| Index numbers of elements in the quantization state set | Elements in the quantization state set |
|---|---|
| 0 | 0 |
| 1 | $-\frac{\pi}{8}$ |

TABLE 25

Quantization state set 11 of the relative value of the phase

| Index numbers of elements in the quantization state set | Elements in the quantization state set |
|---|---|
| 0 | 0 |
| 1 | π |

As shown in Tables 15 to 25, the quantization state sets 1, 2, 3, and 4 of the relative value of the phases each includes 4 elements or quantization states, among which one specific quantization state may be represented by using 2 bits. For example, the index number of one quantization state may be represented by using 2 bits to report the quantization state of the relative value of the phase. The quantization state sets 5, 6, 7, 8, 9, 10, and 11 of the relative value of the phases each includes 2 elements or quantization states, among which one specific quantization state may be represented by using 1 bit. For example, the index number of one quantization state may be represented by using 1 bit to report the quantization state of the relative value of the phase.

In a case where the second vectors include one or more vectors, the same relative value quantization state set may be reported for all the second vectors, that is, one relative value quantization state set that is applicable to all vectors in the second vectors is reported. For example, a relative value quantization state set of the magnitudes, which is applicable to the magnitudes of weighting coefficients of all vectors in the second vectors, is reported, and a relative value quantization state set of the phases, which is applicable to the phases of weighting coefficients of all vectors in the second vectors, is reported. Alternatively, a relative value quantization state set of the magnitudes or a relative value quantization state set of the phases is reported for each vector in the second vectors, respectively. Alternatively, the vectors in the second vectors are divided into multiple groups, each group includes one or more vectors, and a relative value quantization state set of the magnitudes or a relative value quantization state set of the phases is reported according to the groups, respectively; that is, one group corresponds to a relative value quantization state set of the magnitudes or a relative value quantization state set of the phases. The groups of the second vectors may be divided into different groups according to the power or magnitudes, and a quantization state set of the phases may be reported according to the groups, respectively.

One or more quantization state sets of the relative value of the magnitudes are reported, where the one or more quantization state sets of the relative value of the magnitudes are associated with a group of vectors in the second vectors, respectively, that is, at least one quantization state set of the relative value of the magnitudes corresponds to a group of vectors in the second vectors, that is, this group of vectors is applicable to the corresponding quantization state sets of the relative value of the magnitudes. Alternatively, one or more quantization state sets of the relative value of the phases are reported, where the one or more quantization state sets of the relative value of the phases are associated with a group of vectors in the second vectors, respectively, that is, at least one quantization state set of the relative value of the phases corresponds to a group of vectors in the second vectors, that is, this group of vectors is applicable to the corresponding quantization state sets of the relative value of the phases.

One or more relative value quantization states of the magnitudes are reported, where the one or more relative value quantization states of the magnitudes are associated with a group of vectors in the second vectors, respectively, that is, at least one relative value quantization state of the magnitudes corresponds to a group of vectors in the second vectors, that is, this group of vectors is applicable to the corresponding relative value quantization states of the magnitudes. Alternatively, one or more relative value quantization states of the phases are reported, where the one or more relative value quantization states of the phases are associated with a group of vectors in the second vectors, respectively, that is, at least one relative value quantization state of the phases corresponds to a group of vectors in the second vectors, that is, this group of vectors is applicable to the corresponding relative value quantization states of the phases.

One or more relative value quantization states of the magnitudes are reported, where the one or more relative value quantization states of the magnitudes are associated with a group of sub-bands in the sub-bands, respectively, that is, at least one relative value quantization state of the magnitudes corresponds to a group of sub-bands in the sub-bands, that is, this group of sub-bands is applicable to the corresponding relative value quantization states of the magnitudes. Alternatively, one or more relative value quantization states of the phases are reported, where the one or more relative value quantization states of the phases are associated with a group of sub-bands in the sub-bands, respectively, that is, at least one relative value quantization state of the phases corresponds to a group of sub-bands in the sub-bands, that is, this group of sub-bands is applicable to the corresponding relative value quantization states of the phases.

One or more quantization state sets of the relative value of the magnitudes are reported, where the one or more quantization state sets of the relative value of the magnitudes are associated with a group of sub-bands in the sub-bands, respectively, that is, at least one quantization state set of the relative value of the magnitudes corresponds to a group of sub-bands in the second vectors, that is, this group of sub-bands is applicable to the corresponding quantization state sets of the relative value of the magnitudes. Alternatively, one or more quantization state sets of the relative value of the phases are reported, where the one or more quantization state sets of the relative value of the phases are associated with a group of sub-bands in the sub-bands, respectively, that is, at least one quantization state set of the relative value of the phases corresponds to a group of sub-bands in the second vectors, that is, this group of sub-bands is applicable to the corresponding quantization state sets of the relative value of the phases.

In another embodiment of the present disclosure, the quantization state set of the relative value of the magnitudes or the phases is determined according to the magnitudes of the second vectors. For example, the quantization state set adopted by each vector is determined according to the order of the magnitude of each vector in the second vectors. For example, the quantization state set adopted by each vector is determined according to the magnitude relationship between the magnitudes of the second vectors and a threshold value.

In another embodiment of the present disclosure, the quantization state set is reported through at least one of the following information: an index number of the quantization state set; a name of the quantization state set; the number of bits used for representing information of the quantization state in the quantization state set; or the number of bits used in the information of an element in the quantization state set.

That is, the quantization state set can be reported by reporting the index number of the quantization state set or the name of the quantization state set. When the numbers of elements included in several negotiated or predefined quantization sets are different, or when the numbers of bits used for representing information of the quantization state are different, the adopted quantization state set can also be indicated by reporting the number of bits used for representing information of the quantization state.

When there are many elements in a quantization state set of the magnitudes and the distribution range of these elements is wide, the quantization state set of the magnitudes is applicable to reporting magnitude values whose distribution variation range is large and balanced. For example, the quantization state sets 2, 3, and 4 of the magnitudes each include 4 elements, but the distribution ranges of the elements in each set are different, and thus these sets are applicable to reporting magnitude values that conform to the respective distribution variation ranges of these elements. The quantization state set 5 of the magnitudes includes 2 elements or quantization states, and the distribution range of these elements is small, and thus this set is applicable to reporting magnitude values corresponding to the distribution characteristics of these elements with small bit overhead. The first node can select the used quantization state set according to the characteristics of the magnitude values to be reported, precision requirements and overhead requirements and perform the reporting, to save the overhead and improve the reporting precision.

When there are many elements in a quantization state set of the phases and the distribution range of these elements is wide, this quantization state set of the phases is applicable to reporting phase values whose distribution variation range is large and balanced. For example, the quantization state sets 2, 3, and 4 of the phases each include 4 elements, but the distribution ranges of these elements in each set are different, and thus these sets are applicable to reporting phase values that conform to their respective distribution characteristics of these elements. The quantization state set 5 of the phases includes 2 elements or quantization states, and the distribution range of these elements is small, and thus this set is applicable to reporting phase values corresponding to the distribution characteristics of these elements with small bit overhead. The first node can select the used quantization state set according to the characteristics of the phase values to be reported, precision requirements and overhead requirements and perform the reporting, to save the overhead and improve the reporting precision.

When there are many elements in the quantization state set 1 of the relative value of the magnitudes and the distribution range of these elements is wide, this set is applicable to reporting the relative value of magnitude values whose distribution variation range is large and balanced. The quantization state set 2 of the relative value of the magnitudes includes 2 elements or quantization states, the distribution range of these elements is small, and thus this set is applicable to reporting the relative value of the magnitudes corresponding to the distribution characteristics of these elements with small bit overhead. The first node can select the used quantization state set according to the characteristics of the relative value of the magnitudes to be reported, precision requirements and overhead requirements and perform the reporting, to save the overhead and improve the reporting precision.

There are many elements in the quantization state sets 1, 2, 3, and 4 of the relative value of the phases, the distribution range of these elements is large, and thus these sets are applicable to reporting the relative value of phase values whose distribution variation range is large and balanced. The quantization state sets 5, 6, 7, 8, 9, 10, and 11 of the relative value of the phases each includes 2 elements or quantization states, the distribution range of these elements is small, and thus these sets are applicable to reporting the relative value of the phases corresponding to the distribution characteristics of these elements with small bit overhead. The first node can select the used quantization state set according to the characteristics of the relative value of the phases to be reported, precision requirements and overhead requirements and perform the reporting, to save the overhead and improve the reporting precision.

In another embodiment of the present disclosure, the number of bits is reported in any one of the manners described below.

In a first manner, reported frequency domain sub-bands are divided into M sets and the number of bits of each of the M sets is reported.

For example, the reported frequency domain sub-bands are divided into M sets, and the number of bits of the phases of the weighting coefficients of each set or the number of bits of the relative value of the phases of the weighting coefficients of each set is reported. In another example, the number of bits of the magnitudes of the weighting coefficients of each set or the number of bits of the relative value of the magnitudes of the weighting coefficients of each set is reported. In another example, the reported frequency domain sub-bands are divided into M sets, and the number of bits of the phases of the weighting coefficients of each set and the number of bits of the magnitudes of the weighting coefficients of each set are reported or the number of bits of the relative value of the phases of the weighting coefficients of each set and the number of bits of the relative value of the weighting coefficients of each set are reported.

In a second manner, the number of bits of the weighting coefficients and the number of bits of relative values of the weighting coefficients are reported, respectively.

For example, the number of bits of the phases of the weighting coefficients and the number of bits of the relative value of the phases of the weighting coefficients are set or reported, respectively. In another example, the number of bits of the magnitudes of the weighting coefficients or the number of bits of the relative value of the magnitudes of the weighting coefficients are set or reported, respectively. In another example, the number of bits of the phases of the weighting coefficients, the number of bits of the magnitudes of the weighting coefficients, the number of bits of the relative value of the phases of the weighting coefficients, and the number of bits of the relative value of the magnitudes of the weighting coefficients are set or reported, respectively.

In a third manner, the number of bits is reported according to a layer on a space domain in which the first vector is located.

For example, the number of bits of the phases of the weighting coefficients of the second vectors and the number of bits of the relative value of the phases of the weighting coefficients are reported according to the layer on the space domain in which the first vector is located. In another example, the number of bits of the magnitudes of the weighting coefficients of the second vectors or the number of bits of the relative value of the magnitudes of the weighting coefficients is reported according to the layer on the space domain in which the first vector is located. In another example, the number of bits of the phases of the weighting coefficients of the second vectors, the number of bits of the magnitudes of the weighting coefficients of the second vectors, the number of bits of the relative value of the phases of the weighting coefficients, and the number of bits of the relative value of the magnitudes of the weighting coefficients are reported according to the layer on the space domain in which the first vector is located.

In a fourth manner, the number of bits is reported according to the number of the second vectors in a layer on a space domain in which the first vector is located.

For example, the number of bits of the phases of the weighting coefficients of the second vectors and the number of bits of the relative value of the phases of the weighting coefficients are reported according to the number of the second vectors in the layer on the space domain in which the first vector is located. In another example, the number of bits of the magnitudes of the weighting coefficients of the second vectors or the number of bits of the relative value of the magnitudes of the weighting coefficients is reported according to the number of the second vectors in the layer on the space domain in which the first vector is located. In another example, the number of bits of the phases of the weighting coefficients of the second vectors, the number of bits of the magnitudes of the weighting coefficients of the second vectors, the number of bits of the relative value of the phases of the weighting coefficients, and the number of bits of the relative value of the magnitudes of the weighting coefficients are reported according to the number of the second vectors in the layer on the space domain in which the first vector is located. For example, the space domain in which the first vector is located has two layers, the number of bits in all these two layers is N, the number of the second vectors in all these two layers is K, and the number of bits used by each of the second vectors is N divided by K.

For example, the number of bits of the phases of the weighting coefficients of the second vectors and the number of bits of the relative value of the phases of the weighting coefficients are reported according to the number of the second vectors in each layer on the space domain in which the first vector is located. In another example, the number of bits of the magnitudes of the weighting coefficients of the second vectors or the number of bits of the relative value of the magnitudes of the weighting coefficients is reported according to the number of the second vectors in each layer on the space domain in which the first vector is located. In another example, the number of bits of the phases of the weighting coefficients of the second vectors, the number of bits of the magnitudes of the weighting coefficients of the second vectors, the number of bits of the relative value of the phases of the weighting coefficients, and the number of bits of the relative value of the magnitudes of the weighting coefficients are reported according to the number of the second vectors in each layer on the space domain in which the first vector is located. For example, the space domain in which the first vector is located has two layers, the number of bits in a first layer is N1, the number of the second vectors in the first layer is K1, and the number of bits used by each of the second vectors in the first layer is N1 divided by K1. The number of bits in a second layer is N2, the number of the second vectors in the second layer is K2, and the number of bits used by each of the second vectors in the second layer is N2 divided by K2.

In another embodiment of the present disclosure, the number of bits is used for indicating at least one of the characteristics of the first vector: the number of sub-bands corresponding to the first vector; the number of the second vectors; or whether to report a relative value of the weighting coefficients of the second vectors.

In this embodiment of the present disclosure, the second node configures some sub-bands, and the first node is expected to report a first vector for these configured sub-bands. The first node only reports a first vector on some sub-bands in the configured sub-bands, and the first node reports the number of bits used for reporting channel state information or the number of bits used for reporting information of the first vector to indicate the number of sub-bands corresponding to the reported first vector, thereby saving the overhead, where the channel state information includes the first vector. For example, the number of bits used for reporting the channel state information or the number of bits used for reporting the information of the first vector has a functional relationship with the number of sub-bands corresponding to the reported first vector, and the number of sub-bands corresponding to the reported first vector is indicated by the number of bits used for reporting the information of the channel state information or the number of bits used for reporting the information of the first vector according to the functional relationship. In another example, the number of bits used for reporting the information of the channel state information or the number of bits used for reporting the information of the first vector has a one-to-one correspondence with the number of sub-bands corresponding to the reported first vector, and the number of sub-bands corresponding to the reported first vector is indicated by the number of bits used for reporting information of the channel state information or the number of bits used for reporting the information of the first vector according to this correspondence. In another example, the number of bits used for reporting the information of the channel state information or the number of bits used for reporting the information of the first vector has a determination relationship with the number of sub-bands corresponding to the reported first vector, that is, any one of available numbers of bits used for reporting the information of the channel state information or numbers of bits used for reporting the information of the first vector determines one number of sub-bands corresponding to the reported first vector, and the number of sub-bands corresponding to the reported first vector is indicated by the number of bits used for reporting the information of the channel state information or the number of bits used for reporting the information of the first vector according to this determination relationship.

It is to be additionally noted that the second node configures the number of second vectors that can be reported, and the first node is expected to report the configured number of second vectors or the weighting coefficients of the configured number of second vectors. The first node only reports some second vectors of the configured number of second vectors or the weighting coefficients of these second vectors, and the first node reports the number of bits used for reporting information of channel state information or the number of bits used for reporting the information of the first vector to indicate the number of reported second vectors, thereby saving the overhead, where the channel state information includes the first vector. For example, the number of bits used for reporting the information of the channel state information or the number of bits used for reporting the information of the first vector has a functional relationship with the number of the reported second vectors, and the number of the reported second vectors is indicated by the number of bits used for reporting the information of the channel state information or the number of bits used for reporting the information of the first vector according to the functional relationship. In another example, the number of bits used for reporting the information of the channel state information or the number of bits used for reporting the information of the first vector has a one-to-one correspondence with the number of the reported second vectors, and the number of the reported second vectors is indicated by the number of bits used for reporting the information of the channel state information or the number of bits used for reporting the information of the first vector according to this correspondence. In another example, the number of bits used for reporting the information of the channel state information or the number of bits used for reporting the information of the first vector has a determination relationship with the number of the reported second vectors, that is, any one of available numbers of bits used for reporting the information of the channel state information or numbers of bits used for reporting the information of the first vector determines one number of the reported second vectors, and the number of reported second vectors is indicated by the number of bits used for reporting the information of the channel state information or the number of bits used for reporting the information of the first vector according to this determination relationship.

It is to be additionally noted that the first node may determine whether to report the weighting coefficients of the second vectors in the form of relative values. The first node reports the number of bits used for reporting the information of the channel state information or the number of bits used for reporting the information of the first vector to indicate whether to report the relative values of the weighting coefficients of the second vectors, thereby saving the overhead, where the channel state information includes the first vector. For example, the number of bits used for reporting the information of the channel state information or the number of bits used for reporting the information of the first vector has a functional relationship with whether to report the relative values of the weighting coefficients of the second vectors, and whether to report the relative values of the weighting coefficients of the second vectors is indicated by the number of bits used for reporting the information of the channel state information or the number of bits used for reporting the information of the first vector according to the functional relationship. In another example, the number of bits used for reporting the information of the channel state information or the number of bits used for reporting the information of the first vector has a determination relationship with whether to report the relative values of the weighting coefficients of the second vectors, that is, any one of available numbers of bits used for reporting the information of the channel state information or numbers of bits used for reporting the information of the first vector determines whether to report the relative values of the weighting coefficients of the second vectors, and whether to report the relative values of the weighting coefficients of the second vectors is indicated by the number of bits used for reporting the information of the channel state information or the number of bits used for reporting the information of the first vector according to this determination relationship.

In another embodiment of the present disclosure, a quantization granularity of the quantization state of the relative value of the magnitudes or the phases is the same as a granularity of the quantization state of the magnitudes or the phases; or the quantization granularity of the quantization state of the relative value of the magnitudes or the phases is different from the granularity of the quantization state of the magnitudes or the phases.

The quantization granularity refers to the minimum absolute value of the difference between any two elements in the quantization state set. For example, the granularity of the quantization state set shown in Table 8 is $$\frac{\pi}{4},$$

the granularity of the quantization state set shown in Table 9 is $$\frac{\pi}{2},$$

and the granularity of the quantization state set shown in Table 12 is $\pi$.

The quantization granularity of the relative value of the phases of the weighting coefficients adopts the quantization granularity of the phase value of the weighting coefficients. For example, the quantization state set of the phase values of the weighting coefficients is the quantization state set shown in Table 8, whose granularity is $$\frac{\pi}{4},$$

and then the quantization granularity of the relative value of the phases of the weighting coefficients is also $$\frac{\pi}{4},$$

and the quantization state set of the relative value of the phases of the weighting coefficients is the quantization state set shown in Table 21 or Table 22.

In another example, the quantization state set of the phase values of the weighting coefficients is the quantization state set shown in Table 9, whose granularity is $$\frac{\pi}{2},$$

and then the quantization granularity of the relative value of the phases of the weighting coefficients is also $$\frac{\pi}{2},$$

and the quantization state set of the relative value of the phases of the weighting coefficients is the quantization state set shown in Table 19 or Table 20.

In another embodiment of the present disclosure, the quantization state set of the relative value of the magnitudes or the phases is reported through at least one of the following information: a quantization state set of the magnitudes or the phases; an index number or location of a frequency domain sub-band of the magnitudes or the phases; a quantization state of the magnitudes or the phases; or a preset quantization state set and/or a preset bias value.

In this embodiment of the present disclosure, channel attributes between sub-bands have a correlation, and since the dynamic range of the relative value of the weighting coefficients of the second vectors between sub-bands is smaller than the dynamic range of the values of the weighting coefficients of the second vectors on the sub-bands, the quantization state of the relative value with the small dynamic range is fed back, thereby saving the overhead. The reporting of the quantization state of the phases or the magnitudes of the weighting coefficient is to select an element from a quantization state set having a limited number of elements as the phase or the magnitude of the weighting coefficient. The reported content may be the index number of the element in the quantization state set or the location of the element in the quantization state set. One element in the quantization state set is one quantization state, and a selected element is a quantization state corresponding to a phase or a magnitude. There may be multiple quantization state sets of the weighting coefficients, and the first node reports the used or selected quantization state sets, thereby facilitating the adaptation to the channel state, saving the reporting resource overhead, and improving the reporting precision. For example, the multiple quantization state sets may be predefined or negotiated, and the first node reports the selected or used quantization state sets.

In one solution, the quantization state sets of the relative values of the weighting coefficients are indicted by using the reported quantization state sets of the values of the used weighting coefficients. For example, a quantization state set of the relative value of the magnitudes is indicated by using a quantization state set of the magnitudes, or a quantization state set of the relative value of the phases is indicated by using a quantization state set of the phases.

The correspondence between the quantization state sets of the weighting coefficients and the quantization state sets of the relative values of the weighting coefficients can be determined in advance by the protocol or negotiated in advance by the first node and the second node. The correspondence may be the correspondence between the index numbers of the quantization state sets of the weighting coefficients and the index numbers of the quantization state sets of the relative values of the weighting coefficients, may also be the correspondence between the number of elements included in the quantization state sets of the weighting coefficients and the number of elements included in the quantization state sets of the relative values of the weighting coefficients, may also be the correspondence between the numbers of bits used for reporting the elements in the quantization state sets of the weighting coefficients and the number of bits used for reporting the elements in the quantization state sets of the relative values of the weighting coefficients, and may also be the correspondence between at least one of the following characteristics of the quantization state sets of the weighting coefficients and at least one of the following characteristics of the quantization state sets of the relative values of the weighting coefficients: a quantization state set index number; the number of elements included in the quantization state set; or the number of bits used for reporting the elements in the quantization state set.

In another solution, the values of the weighting coefficients of the second vectors are reported by using one or more sub-bands, that is, the direct values instead of the relative values are reported, while the relative values of the weighting coefficients of the second vectors are reported for other sub-bands. The quantization state sets used for reporting the relative values of the weighting coefficients of the second vectors are indicated by the index numbers or locations of the sub-bands corresponding to the direct values of the weighting coefficients of the second vectors. For example, the index numbers or locations of the sub-bands are associated with the index numbers of the quantization state sets of the relative values of the weighting coefficients; or the index numbers or locations of the sub-bands are associated with the numbers of elements included in the quantization state sets of the relative values of the weighting coefficients; or the index numbers or locations of the sub-bands are associated with the numbers of bits used for reporting the elements in the quantization state sets of the relative values of the weighting coefficients. The quantization state sets of the relative values of the weighting coefficients having corresponding characteristics are indicated by reporting the index numbers or locations of the sub-bands corresponding to the direct values of the weighting coefficients of the second vectors.

In another solution, for example, the correspondence between the quantization state sets of the weighting coefficients and the quantization state sets of the relative values of the weighting coefficients is established, and the quantization state sets of the relative values of the weighting coefficients are indicated by the quantization states of the values of the weighting coefficients. In another example, the correspondence between sequences of the quantization states of the values of the weighting coefficients in a quantization state set to which each of these quantization states belongs and the quantization state sets of the relative values of the weighting coefficients is established, and the quantization state sets of the relative values of the weighting coefficients are indicated by the quantization states of the values of the weighting coefficients. In another example, elements having smaller values in the quantization state sets of the weighting coefficients are associated with quantization state sets, in which quantization states need to be reported by using smaller numbers of bits, of the relative values of the weighting coefficients, and elements having larger values in the quantization state sets of the weighting coefficients are associated with quantization state sets, in which quantization states need to be reported by using larger numbers of bits, of the relative values of the weighting coefficients.

In another solution, for example, one predetermined quantization state set and one predetermined bias value are reported, and the elements in the quantization state set of the relative value are the sum of elements in the reported predetermined quantization state set and the reported predetermined bias value. For example, if the reported predetermined quantization state set is the quantization state set shown in Table 15, the reported predetermined bias value is $$-\frac{\pi}{4},$$

and the quantization state set of the relative value is the quantization state set shown in Table 17.

In another example, the reported predetermined quantization state set is the quantization state set shown in Table 16, the reported predetermined bias value is $$\frac{\pi}{4},$$

and then the quantization state set of relative value is the quantization state set shown in Table 18.

In another embodiment of the present disclosure, the quantization state set of the phases or the quantization state set of the relative value of the phases has at least one of the following characteristics: a negative phase element is included; a negative phase element and a positive phase element are included; the number of negative phase elements included is greater than the number of positive phase elements; or the number of negative phase elements included is less than the number of positive phase elements.

In this embodiment of the present disclosure, according to the channel state, sets with different quantization state distributions are used, thereby saving the overhead and improving the feedback precision. For example, there are the quantization state sets shown in Table 15, Table 16, Table 17, Table 18, Table 19, Table 20, Table 21, Table 22, Table 23, Table 24, and Table 25, where the quantization state sets shown in Tables 16, 17, 18, 20, 22, and 24 include negative phase elements, and the quantization state sets shown in Tables 17 and 18 include both negative phase elements and positive phase elements, where negative phase elements included in the quantization state set shown in Table 18 is more than positive phase elements, and negative phase elements included in the quantization state set shown in Table 17 is less than positive phase elements.

In another embodiment of the present disclosure, the vectors of which elements have the one-to-one correspondence with the reported frequency domain sub-bands are reported through any one of:

consecutive orthogonal vectors numbered at equal intervals in candidate codebook vectors; where for example, the candidate codebook C is one vector set in which elements are vectors $c_k$, where k is a sequence number of an element and values 0, 1, 2, . . . , and N; the second vectors include a group of vectors from the candidate codebook C, for example, $c_{k_0}, c_{k_1}, \ldots c_{k_i}, c_{k_{i+1}}, \ldots, c_{k_M}$, every two vectors in this group of vectors are orthogonal with each other, and $k_1-k_0=k_2-k_1= \ldots =k_{i+1}-k_i= \ldots =k_M-k_{M-1}$, where $k_0$, $k_1$, $k_2$, $k_i$, $k_{i+1}$, . . . , and km are sequence numbers of elements in the candidate codebook C;

a vector in the vectors of which elements have the one-to-one correspondence with the reported frequency domain sub-bands; or a vector in the candidate codebook vectors.

For example, $c^k$ is one of the second vectors and comes from the candidate codebook, and by reporting the vector $c_k$, that the following group of vectors $c_k$, $c_{k+P}$, $c_{k+2P}$, ..., $c_{k+(Q-1)P}$ is a group of vectors included in the second vectors is indicated, where Q and P are positive integers. In another example, $c^k$ is one of the second vectors and comes from the candidate codebook, and by reporting the vector $c_k$, that the following group of vectors $c_{k-(Q-1)P}$, ..., $c_{k-2P}$, $c_{k-P}$, $c_k$, $c_{k+P}$, $c_{k+2P}$, ..., $c_{k+(Q-1)P}$ is a group of vectors included in the second vectors is indicated, where Q and P are positive integers.

Figure 2:
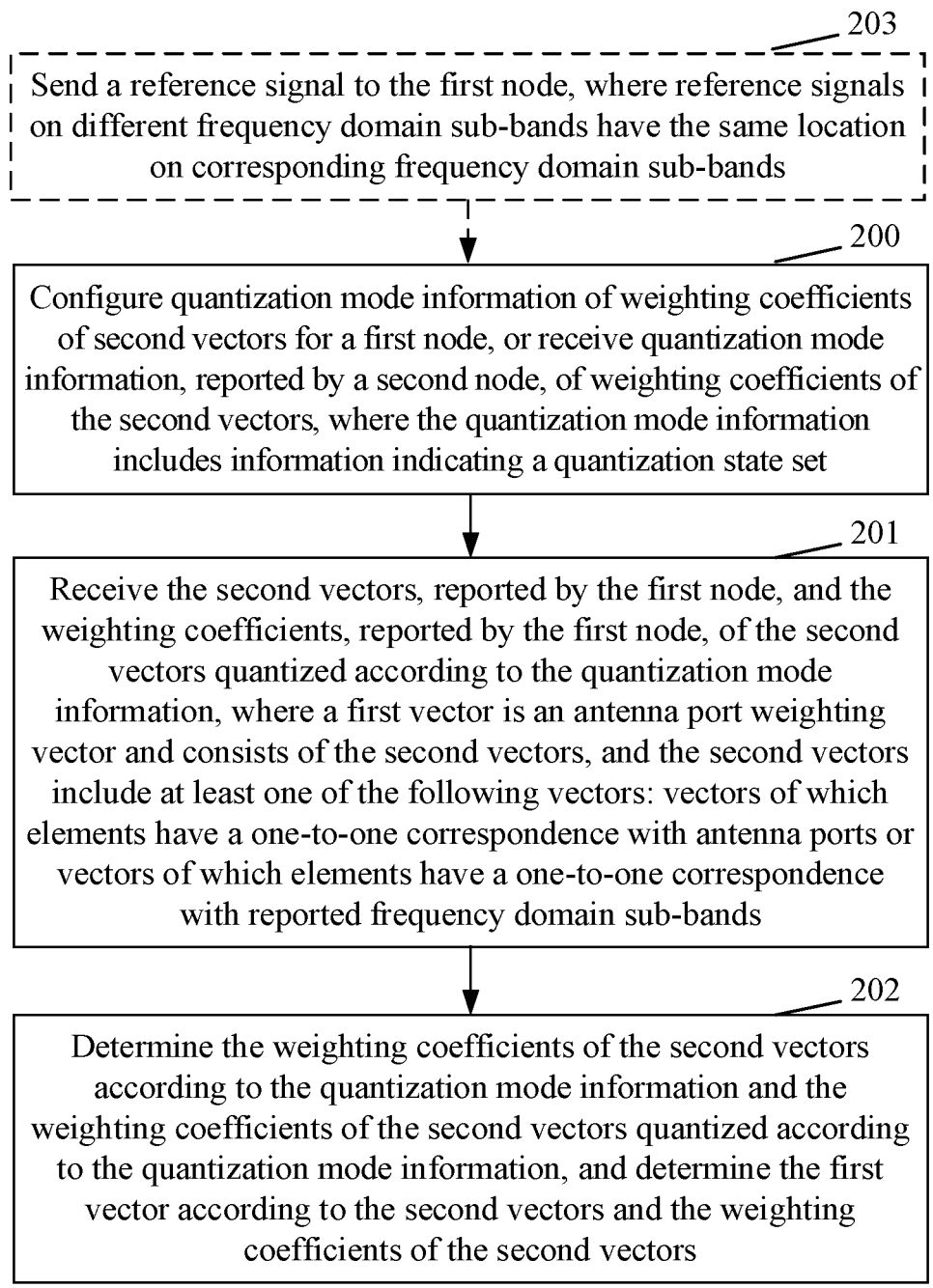
FIG. 2 is a flowchart of a method for reporting an antenna port weighting vector according to another embodiment of the present disclosure.

With reference to FIG. 2, another embodiment of the present disclosure provides a method for acquiring an antenna port weighting vector. The method is applied to a second node (for example, a base station side) and includes the steps S200 to S202.

In step S200, quantization mode information of weighting coefficients of second vectors is configured for a first node, or quantization mode information, reported by a second node, of weighting coefficients of the second vectors is received, where the quantization mode information includes information indicating a quantization state set.

In step S201, the second vectors, reported by the first node, and the weighting coefficients, reported by the first node, of the second vectors quantized according to the quantization mode information are received, where a first vector is an antenna port weighting vector and consists of the second vectors, and the second vectors include at least one of the following vectors: vectors of which elements have a one-to-one correspondence with antenna ports or vectors of which elements have a one-to-one correspondence with reported frequency domain sub-bands.

In step S202, the weighting coefficients of the second vectors are determined according to the quantization mode information and the weighting coefficients of the second vectors quantized according to the quantization mode information, and the first vector is determined according to the second vectors and the weighting coefficients of the second vectors.

In this embodiment of the present disclosure, the antenna port may be referred to as an antenna port of the first node or an antenna port of the second node.

The antenna port transmits data or signals. Weighting the antenna port of the transmitting side (for example, the first node or the second node) or applying weighting coefficients to the data or signals transmitted by the antenna port of the transmitting side can increase the performance of data or signal transmission, which is generally described as applying precoding to the antenna port of the transmitting side. Each antenna port has one weighting coefficient, and the weighting coefficients on multiple antenna ports constitute one weighting coefficient vector, which is referred to as an antenna port weighting vector or precoding.

The antenna port represents an antenna. Different antenna ports distinguish different antennas, representing that different channels that the transmitted data or signals pass through have different channel attributes. Antenna ports each have a number or an index number to distinguish.

There are two cases in which the first node (for example, a terminal) reports the antenna port weighting vector to the second node (for example, a base station). In one case, the weighting vector to be used by the transmit antenna port of the second node is reported by the first node. In the other case, the weighting vector to be used by the transmit antenna port of the first node is reported by the first node to the second node.

In this embodiment of the present disclosure, the weighting vector used for the antenna port is composed of other vectors. For ease of description, the weighting vector used for the antenna port is referred to as a first vector, and the vector that constitutes the first vector is referred to as a second vector. The first vector consists of the second vectors. The first node reports the second vectors and coefficients required for the second vectors constituting the first vector to the second node.

In this embodiment of the present disclosure, the wireless communication always performs transmission on time-frequency resources. Performing unit structuring on frequency domain resources can improve the utilization efficiency of the frequency domain resources. For example, the frequency domain resources are subdivided into minimum frequency domain units, which are subcarriers. Multiple subcarriers form one resource block, and multiple resource blocks form one sub-band. The wireless communication may be performed on multiple sub-bands. The channel attribute may vary on different frequency domains, that is, the channel attribute is not the same, but channel attributes on adjacent frequency domains have a correlation or an approximation, so the farther the distance of channel attributes on the frequency domains, the lower the correlation of the channel attributes. In order to save the overhead while accommodating channel variations on the frequency domains, the antenna port weighting vectors are reported according to the frequency domain sub-bands, that is, the weighting vectors used by the transmitting-side antenna ports on different frequency domain sub-bands are reported, or the weighting vectors used by the transmitting-side antenna ports are reported for the frequency domain sub-bands. For example, when the second node is to transmit data on [sub-band 0, sub-band 1, ..., sub-band N−1] of the frequency domain, the second node needs to use weighting vectors on corresponding sub-bands, respectively, that is, the first node needs to report to the second node the weighting vectors used by the transmitting-side antenna ports of the second node on these sub-bands. Alternatively, when the first node is to transmit data at [sub-band 0, sub-band 1, ... sub-band N−1] of the frequency domain, the first node needs to use weighting vectors on corresponding sub-bands, respectively, that is, the first node needs to report to the second node the weighting vectors used by the transmitting-side antenna ports of the first node on these sub-bands. The second node receives reports of the weighting vectors on these sub-bands to make scheduling policies.

The second vectors include at least one of the following two kinds of vectors: vectors of which elements have a one-to-one correspondence with antenna ports or vectors of which elements have a one-to-one correspondence with reported frequency domain sub-bands. For example, U is a second vector including elements $[u_0, u_1, \ldots, u_{N-1}]$, where N is a positive integer, and each of these elements corresponds to a respective antenna port. In another example, U is a second vector including elements $[u_0, u_1, \ldots, u_{N-1}]$, where N is a positive integer and each of these elements corresponds to a respective one of the reported frequency domain sub-bands.

In this embodiment of the present disclosure, the second vector may be a set of vectors, where the elements of each vector correspond to an antenna port. The first node may feed back the second vectors according to the sub-bands or may feed back the weighting coefficients of the second vectors according to the sub-bands.

Alternatively, the second vector may be a set of vectors, where the elements of each vector correspond to a sub-band.

The first node may feed back the second vectors according to antenna ports or may feed back the weighting coefficients of the second vectors according to the antenna ports.

For example, the second vectors are a set of vectors including the following vectors: B(0), B(1), B(2), . . . , B(m), . . . , and B(M−1). The weighting coefficients corresponding to the vectors in the second vectors are: c(0), c(1), c(2), . . . , c(m), . . . , and c(M−1). The second vectors and their weighting coefficients are combined in a linear manner, for example, the combined first vector is the following formula.

A=c(0)×B(0)+c(1)×B(1)+c(2)×B(2), +c(m)×B(m), +c(M−1)×B(M−1), where m represents a sequence number of a vector or a sequence number of a coefficient of a vector, + represents the addition operation, and × represents the multiplication operation.

Alternatively, the first node can not only feed back second vectors of which elements correspond to antenna ports, where these second vectors are referred to as a Ba vector for ease of description, but also feed back second vectors of which elements correspond to the sub-bands, where these second vectors are referred to as a Bs vector for ease of description; and the first node can also feed back a coefficient matrix Cab of the Ba vector and the Bs vector. The Ba vector, the Bs vector, and the coefficient matrix Cab are combined into the first vector in the following manner: A=Ba×Cab×Bs' or A=Bs×Cab×Ba'. The first vector A calculated in this case is actually a matrix, and thus, the obtained matrix needs to be split into vectors. That is, a group of first vectors is obtained in this case, and each of the first vectors can be split according to sub-bands, that is, elements of each of the first vectors are in a one-to-one correspondence to sub-bands, or each of the first vectors can be split according to antenna ports, that is, elements of each of the first vectors are in a one-to-one correspondence to antenna ports.

The to-be-selected vectors of the second vectors may be pre-defined or pre-negotiated.

In another embodiment of the present disclosure, the information indicating the quantization state set includes at least one of a quantization state set index number; an element in the quantization state set; a characteristic of an element in the quantization state set; the number of quantization states included in the quantization state set; a characteristic of a quantization state included in the quantization state set; the number of bits used for reporting a quantization state in the quantization state set; direct quantization on the weighting coefficients of the second vectors; or quantization on the weighting coefficients of the second vectors by using a relative value between the different frequency domain sub-bands.

In this embodiment of the present disclosure, the weighting coefficients of the second vectors are transmitted according to the quantization mode information configured by the second node or the quantization mode information reported to the second node, to obtain or select the quantization mode suitable for the channel scenario, thereby providing a sufficiently high reporting precision by using relatively small resource overhead, saving reporting resource overhead, and improving the resource utilization rate.

In another embodiment of the present disclosure, before the second vectors, reported by the first node, and the weighting coefficients, reported by the first node, of the second vectors quantized according to the quantization mode information are received, the method further includes the step 203.

In step 203, a reference signal is sent to the first node, where reference signals on different frequency domain sub-bands have the same location on corresponding frequency domain sub-bands.

In this embodiment of the present disclosure, only when the reference signals on different frequency domain sub-bands have the same location on the corresponding frequency domain sub-bands can the consistency of the measurement channel method on each sub-band be guaranteed, thereby eliminating errors caused by differences in the locations of the reference signals between sub-bands. The same location of the reference signals on the different frequency domain sub-bands on the corresponding frequency domain sub-bands means that the location of the sub-carrier in which the reference signal on each of the reported sub-bands is located is the same.

That the location of the reference signal on each sub-band is the same includes that there are associated reference signals on each frequency domain sub-band for the reporting, and the location of the subcarrier of the reference signal on each sub-band is the same. For example, the frequency domain sub-bands for the reporting are sub-band 0, sub-band 1, sub-band 2, and sub-band 3. Each of these sub-bands has an associated reference signal. One case of the location of the associated reference signal in the sub-band is that each resource block in the sub-band has an associated reference signal, as shown in Table 1.

Another case is that the associated reference signal is in part of resources of the sub-band, as shown in Table 2.

In this embodiment of the present disclosure, in principle, the weighting coefficient of the vector with the strongest power in the second vectors may be any value. In order to save the reporting resource overhead and improve the resource utilization rate, the weighting coefficient of the vector with the strongest power in the second vectors may be agreed to be a first preset value (for example, 1). In this manner, it is not necessary to report the weighting coefficient of the vector with the strongest power, but only the index number or location of the vector with the strongest power needs to be reported. When the second node combines the first vector, the value of the weighting coefficient of the vector with the strongest power is taken as the first preset value to participate in the operation.

In another embodiment of the present disclosure, the step in which the weighting coefficients, reported by the first node, of the second vectors quantized according to the quantization mode information are received includes: receiving at least one of the following information reported by the first node: a vector whose weighting coefficient is a second preset value in the second vectors, where the second preset value includes at least one of 0 or 1; a vector whose weighting coefficient has a maximum magnitude in the second vectors; a vector with the strongest power in the second vectors; an index number of a frequency domain sub-band or a location in which the frequency domain sub-band is located, and weighting coefficients of the second vectors on the frequency domain sub-band quantized according to the quantization mode information or a relative value of the quantized weighting coefficients of the second vectors on the frequency domain sub-band, where it is to be noted that the index numbers or locations of the sub-bands corresponding to the second vectors and the weighting coefficients of the second vectors quantized according to the quantization mode information on the corresponding sub-bands are reported so that the second node understands the correspondence between the reported weighting coefficients of the second vectors quantized according to the quantization mode information and the sub-bands, for example, only the weighting coefficients of second vectors quantized according to the quantization mode information on part of the sub-bands are reported, and the index numbers of these sub-bands are reported to save overhead, where the reporting of the index numbers of these sub-bands enables the second node to understand the sub-bands corresponding to the reported weighting coefficients of the second vectors quantized according to the quantization mode information, in another example, the weighting coefficients of the second vectors quantized according to the quantization mode information on the sub-bands are reported according to the magnitude values, and the index numbers of these sub-bands are reported, where the reporting of the index numbers of the sub-bands enables the second node to understand the sub-bands corresponding to the reported weighting coefficients of the second vectors quantized according to the quantization mode information, in another example, the weighting coefficients of the second vectors quantized according to the quantization mode information on the sub-bands are reported according to phase values, and the index numbers of these sub-bands are reported, where the reporting of the index numbers of the sub-bands enables the second node to understand the sub-bands corresponding to the reported weighting coefficients of the second vectors quantized according to the quantization mode information, where the weighting coefficients of the second vectors quantized according to the quantization mode information herein are referred to as direct values of the weighting coefficients of the second vectors quantized according to the quantization mode information, and also referred to as relative values of the weighting coefficients of the second vectors quantized according to the quantization mode information; a weighting coefficient of a second vector on a frequency domain sub-band group quantized according to the quantization mode information, where, for example, the frequency domain sub-bands are divided into S groups, and the weighting coefficients of the second vectors quantized according to the quantization mode information are fed back according to groups, where S is a positive integer, for example, the frequency domain sub-bands are divided into 2 groups, a group of weighting coefficients of the second vectors quantized according to the quantization mode information is fed back for a first group, and another group of weighting coefficients of the second vectors quantized according to the quantization mode information is fed back for a second group, for example, the frequency domain sub-bands are divided into 3 groups, a group of weighting coefficients of the second vectors quantized according to the quantization mode information is fed back for a first group, another group of weighting coefficients of the second vectors quantized according to the quantization mode information is fed back for a second group, and another group of weighting coefficients of the second vectors quantized according to the quantization mode information is fed back for a third group, for example, the frequency domain sub-bands are divided into 4 groups, a group of weighting coefficients of the second vectors quantized according to the quantization mode information is fed back for a first group, another group of weighting coefficients of the second vectors quantized according to the quantization mode information is fed back for a second group, another group of weighting coefficients of the second vectors quantized according to the quantization mode information is fed back for a third group, and another group of weighting coefficients of the second vectors quantized according to the quantization mode information is fed back for a fourth group, and in this manner, since a group of frequency domain sub-bands often includes multiple sub-bands, the feedback of the weighting coefficients of the second vectors quantized according to the quantization mode information according to the frequency domain sub-band groups can save the overhead, and the simultaneous feedback of the weighting coefficients of multiple second vectors can reduce the error caused by the excessive bandwidth; magnitudes of the weighting coefficients of the second vectors quantized according to the quantization mode information; or phases of the weighting coefficients of the second vectors quantized according to the quantization mode information. The method further includes: determining, according to at least one of the above information reported by the first node, the weighting coefficients of the second vectors quantized according to the quantization mode information.

In this embodiment of the present disclosure, the reported weighting coefficients quantized according to the quantization mode information are generally represented by the magnitudes and the phase of the weighting coefficients quantized according to the quantization mode information. Since there are some vectors whose weighting coefficients are a second preset value (for example, 0, or their weighting coefficients are extremely small and thus are regarded as 0) in the second vectors, only the index numbers of the vectors whose weighting coefficients are the second preset value or the locations in which these vectors are located need to be fed back, and the magnitudes and the phases of the weighting coefficients of these vectors need not be fed back one by one, thereby saving the overhead. Meanwhile, when the second node combines the first vector, these vectors whose weighting coefficients are 0 may not need to participate in the combination operation or may simplify the combination operation, thereby simplifying the coefficient complexity.

The vectors whose weighting coefficients have the maximum magnitude or the vectors with the strongest power can be used as reference second vectors to normalize the weighting coefficients of other second vectors, thereby reducing the accumulated error between the weighting coefficients of the second vectors.

In this embodiment of the present disclosure, the index numbers of the above-mentioned vectors may be the index numbers of to-be-selected vectors or the index numbers of vectors in the selected vector set. For example, the index number of a vector whose index number is required to be fed back in the to-be-selected vectors is D(i), and the index number of this vector in the selected vector set is Y(k). The first node may feed back the index number D(i) in the to-be-selected vectors or the index number Y(k) in the selected vector set. Alternatively, the location of this vector in the to-be-selected vectors or the location of this vector in the selected vector set is fed back in a manner of bit mapping.

In another embodiment of the present disclosure, the step in which the vector, reported by the first node, whose weighting coefficient is the second preset value is received includes: receiving any one of the following information reported by the first node: an index number of the vector whose weighting coefficient is the second preset value, a location in which the vector whose weighting coefficient is the second preset value is located, a numerical value having a mapping relationship with the index number of the vector whose weighting coefficient is the second preset value, or a numerical value having a mapping relationship with the location in which the vector whose weighting coefficient is the second preset value is located. The method further includes: determining, according to any one of the above information reported by the first node, the vector whose weighting coefficient is the second preset value. Specifically, when the first node reports the index number of the vector whose weighting coefficient is the second preset value, the vector corresponding to the index number reported by the first node is directly determined as the vector whose weighting coefficient is the second preset value. When the first node reports the location in which the vector whose weighting coefficient is the second preset value is located, the vector corresponding to the location reported by the first node is directly determined as the vector whose weighting coefficient is the second preset value. When the first node reports a numerical value having a mapping relationship with the index number of the vector whose weighting coefficient is the second preset value, the vector whose weighting coefficient is the second preset value is determined according to the mapping relationship between the reported numerical value and the index number of the vector whose weighting coefficient is the second preset value. When the first node reports a numerical value having a mapping relationship with the location in which the vector whose weighting coefficient is the second preset value is located, the vector whose weighting coefficient is the second preset value is determined according to the mapping relationship between the reported numerical value and the location in which the vector whose weighting coefficient is the second preset value is located.

In another embodiment of the present disclosure, the step in which the vector, reported by the first node, whose weighting coefficient has the maximum magnitude is received includes: receiving any one of the following information reported by the first node: an index number of the vector whose weighting coefficient has the maximum magnitude, a location in which the vector whose weighting coefficient has the maximum magnitude is located, a numerical value having a mapping relationship with the index number of the vector whose weighting coefficient has the maximum magnitude, or a numerical value having a mapping relationship with the location in which the vector whose weighting coefficient has the maximum magnitude is located. The method further includes: determining, according to any one of the above information reported by the first node, the vector whose weighting coefficient has the maximum magnitude.

Specifically, when the first node reports the index number of the vector whose weighting coefficient has the maximum magnitude, the vector corresponding to the index number reported by the first node is directly determined as the vector whose weighting coefficient has the maximum magnitude. When the first node reports the location in which the vector whose weighting coefficient has the maximum magnitude is located, the vector corresponding to the location reported by the first node is directly determined as the vector whose weighting coefficient has the maximum magnitude. When the first node reports a numerical value having a mapping relationship with the index number of the vector whose weighting coefficient has the maximum magnitude, the vector whose weighting coefficient has the maximum magnitude is determined according to the mapping relationship between the reported numerical value and the index number of the vector whose weighting coefficient has the maximum magnitude is located. When the first node reports a numerical value having a mapping relationship with the location in which the vector whose weighting coefficient has the maximum magnitude is located, the vector whose weighting coefficient has the maximum magnitude is determined according to the mapping relationship between the reported numerical value and the location in which the vector whose weighting coefficient has the maximum magnitude is located. In another embodiment of the present disclosure, the step in which the vector with the strongest power reported by the first node is received includes: receiving any one of the following information reported by the first node: an index number of the vector with the strongest power, a location in which the vector with the strongest power is located, a numerical value having a mapping relationship with the index number of the vector with the strongest power, or a numerical value having a mapping relationship with the location in which the vector with the strongest power is located. The method further includes: determining, according to any one of the above information reported by the first node, the vector with the strongest power. Specifically, when the first node reports the index number of the vector with the strongest power, the vector corresponding to the index number reported by the first node is directly determined as the vector with the strongest power. When the first node reports the location in which the vector with the strongest power is located, the vector corresponding to the location reported by the first node is directly determined as the vector with the strongest power. When the first node reports a numerical value having a mapping relationship with the index number of the vector with the strongest power, the vector with the strongest power is determined according to the mapping relationship between the reported numerical value and the index number of the vector with the strongest power. When the first node reports a numerical value having a mapping relationship with the location in which the vector with the strongest power is located, the vector with the strongest power is determined according to the mapping relationship between the reported numerical value and the location in which the vector with the strongest power is located.

In another embodiment of the present disclosure, the step in which the magnitudes or the phases, reported by the first node, of the weighting coefficients of the second vectors quantized according to the quantization mode information are received includes: receiving at least one of the following information reported by the first node: a quantization state of the magnitudes or the phases, or a quantization state of a relative value of the magnitudes or the phases of the second vectors between the different frequency domain sub-bands. The method further includes: determining, according to at least one of the above information reported by the first node, the magnitudes or the phases of the weighting coefficients of the second vectors quantized according to the quantization mode information.

In this embodiment of the present disclosure, channel attributes between sub-bands have a correlation, and since the dynamic range of the relative value of the weighting coefficients of the second vectors between sub-bands is smaller than the dynamic range of the values of the weighting coefficients of the second vectors on the sub-bands, the quantization state of the relative value with the small dynamic range is fed back, thereby saving the overhead.

The weighting coefficient consists of a phase and a magnitude, that is, the weighting coefficient includes two parts: one part is the phase and the other part is the magnitude. For example, the weighting coefficient of the sub-band m is $A_m e^{j\varphi_m}$, where $A_m$ is the magnitude, and $\varphi_m$ is the phase, and the weighting coefficient of the sub-band n is $A_n e^{j\varphi_n}$, where $A_n$ is the magnitude, and $\varphi_n$ is the phase. The relative value of the magnitude of the weighting coefficient of the sub-band n with respect to the sub-band m is $\frac{A_n}{A_m}$, and the relative value of the phase of the weighting coefficient of the sub-band n with respect to the sub-band m is $\varphi_n - \varphi_m$. The first node selects a quantization state from a quantization state set SA of the magnitudes for $\frac{A_n}{A_m}$, selects a quantization state from a quantization state set $S_p$ of the phases for $\varphi_n - \varphi_m$, and then preforms the reporting, where the sub-band m is a reference sub-band. For example, the weighting coefficient of the sub-band 0 is $0.8 e^{\frac{j\pi}{2}}$, where 0.8 is the magnitude, and $\frac{\pi}{2}$ is the phase. The weighting coefficient of the sub-band 1 is $0.7 e^{\frac{j3\pi}{4}}$.

A quantization state is selected from a quantization state set $\left\{ 1, \frac{\sqrt{2}}{2} \right\}$ of the magnitudes for the relative value $\frac{0.7}{0.8}$ of the magnitude of the weighting coefficient of the sub-band 1 with respect to the sub-band 0, for example, the selected quantization state is 0, and then the reporting is performed; a quantization state is selected from a quantization state set $\left\{ 0, \frac{\pi}{4} \right\}$ of the phases for the relative value $\frac{3\pi}{4} - \frac{\pi}{2}$ of the phase of the weighting coefficient of the sub-band 1 with respect to the sub-band 0, for example, the selected quantization state is $\frac{\pi}{4}$, and then the reporting is performed; where the sub-band 0 is a reference sub-band.

The reference value of the relative value of the magnitudes or the phases includes any one of: a magnitude or a phase of a reference sub-band, or a quantization state of the magnitude or the phase of the reference sub-band.

For example, the weighting coefficient of the sub-band m is $A_m e^{j\varphi_m}$, where $A_m$ is the magnitude, and $\varphi_m$ is the phase. The magnitude value of the weighting coefficient reported for the reference sub-band m is $A_m'$, and the phased value of the reported weighting coefficient is $\varphi_m'$. The weighting coefficient of the sub-band n is $A_n e^{j\varphi_n}$, where $A_n$ is the magnitude, and $\varphi_n$ is the phase. The relative value of the report value of the magnitude of the weighting coefficient of the sub-band n with respect to the reference sub-band m is $\frac{A_n}{A_m'}$, that is, the reference value of the relative value of the magnitude of the weighting coefficient of the sub-band n is the report value of the magnitude of the weighting coefficient of the sub-band m. The relative value of the report value of the phase of the weighting coefficient of the sub-band n with respect to the sub-band m is $\varphi_n - \varphi_m'$, that is, the reference value of the relative value of the phase of the weighting coefficient of the sub-band n is the report value of the phase of the weighting coefficient of the sub-band m. The first node selects a quantization state from a quantization state set $S_A$ of the magnitudes for $\frac{A_n}{A_m'}$, selects a quantization state from a quantization state set $S_p$ of the phases for $\varphi_n - \varphi_m'$, and then preforms the reporting. For example, the weighting coefficient of the sub-band 0 is $0.8 e^{\frac{j5\pi}{2}}$, where 0.8 is the magnitude, and $\frac{5\pi}{2}$ is the phase. The magnitude value of the weighting coefficient reported for the sub-band 0 is 1, and the phase value of the reported weighting coefficient is $\frac{\pi}{2}$.

The weighting coefficient of the sub-band 1 is $$0.7e^{j\frac{3\pi}{4}}.$$

A quantization state is selected from a quantization state set $$\left\{1, \frac{\sqrt{2}}{2}\right\}$$

of the magnitudes for the relative value $$\frac{0.7}{1}$$

of the report value of the magnitude of the weighting coefficient of the sub-band 1 with respect to the sub-band 0, for example, the selected quantization state is $$\frac{\sqrt{2}}{2},$$

and then the reporting is performed. A quantization state is selected from a quantization state set $$\left\{0, \frac{\pi}{4}\right\}$$

of the phases for the relative value $$\frac{3\pi}{4} - \frac{\pi}{2}$$

of the report value of the phase of the weighting coefficient of the sub-band 1 with respect to the sub-band 0, for example, the selected quantization state is $$\frac{\pi}{4},$$

and then the reporting is performed.

In this embodiment of the present disclosure, the reference value of the relative value is the reported value (that is, the quantization state of the magnitude or the phase of the reference sub-band), which reduces the error of the finally formed target report value, thereby improving the precision of the target report value. Since the quantization usually generates errors, if the reference value of the relative value is not the report value, the target report value includes the quantization error of the reference value and the quantization error of the relative value. The reference value of the relative value adopts the report value, which cancels out the quantization error of the reference value, so there is only the quantization error of the relative value, thereby improving the error of the target report value. The report value of the magnitude or the report value of the phase of the weighting coefficient of the sub-band n or the sub-band 1 in the above-mentioned examples is the target report value.

In another embodiment of the present disclosure, the step in which the quantization states, reported by the first node, of the magnitudes or the phases are received includes: receiving any one of the following information reported by the first node: a quantization state set of the magnitudes or the phases, a quantization state in the quantization state set, and a vector or a vector group using the quantization state in the second vectors; a quantization state set of the magnitudes or the phases, a quantization state in the quantization state set, vectors using the quantization state set in the second vector, and a vector, in the vectors using the quantization state set, using the quantization state; a quantization state set of the magnitudes or the phases, a quantization state in the quantization state set, a vector group using the quantization state set in the second vectors, and a vector using the quantization state in the vector group; the quantization states of the magnitudes or the phases, and a vector or a vector group, in the second vectors, using the quantization state of the magnitudes or the phases; the quantization states of the magnitudes or the phases, and a sub-band or a sub-band set using the quantization states of the magnitudes or the phases; a quantization state set of the magnitudes or the phases, a quantization state in the quantization state set, sub-bands using the quantization state set, and a sub-band, in the sub-bands using the quantization state set, using the quantization state; or a quantization state set of the magnitudes or the phases, a quantization state in the quantization state set, a sub-band group using the quantization state set, and a sub-band, in the sub-band group, using the quantization state. The method further includes: determining, according to any one of the above information reported by the first node, the quantization state of the magnitudes or the phases.

In this embodiment of the present disclosure, the reporting of the quantization state of the phases or the magnitudes of the weighting coefficient is to select an element from a quantization state set having a limited number of elements as the phase or the magnitude of the weighting coefficient. The reported content may be the index number of the element in the quantization state set or the location of the element in the quantization state set. One element in the quantization state set is one quantization state, and a selected element is a quantization state corresponding to a phase or a magnitude. For example, an element is selected from the quantization state set $$\left\{1, \frac{\sqrt{2}}{2}\right\}$$

for the magnitude value and then the reporting is performed, or an element is selected from the quantization state set $$\left\{0, \frac{\pi}{2}\right\}$$

for the phase value and then the reporting is performed.

There may be multiple quantization state sets, and the first node reports the used or selected quantization state sets, thereby facilitating the adaptation to the channel state, saving the reporting resource overhead, and improving the reporting precision. For example, the multiple quantization state sets may be predefined or negotiated, and the first node reports the selected or used quantization state sets. For example, there are examples of quantization state sets of the magnitudes in Tables 3 to 7.

As shown in Tables 3 to 7, the quantization state set 1 of the magnitudes includes 8 elements or quantization states, among which one specific quantization state may be represented by using 3 bits. For example, the index number of one quantization state may be represented by using 3 bits to report the quantization state of the magnitude value. The quantization state set 2, 3, or 4 of the magnitudes includes 4 elements or quantization states, among which one specific quantization state may be represented by using 2 bits. For example, the index number of one quantization state may be represented by using 2 bits to report the quantization state of the magnitude value. The quantization state set 5 of the magnitudes includes 2 elements or quantization states, among which one specific quantization state may be represented by using 1 bit. For example, the index number of one quantization state may be represented by using 1 bit to report the quantization state of the magnitude value.

There are examples of quantization state sets of the phases in Tables 8 to 12.

As shown in Tables 8 to 12, the quantization state set 1 of the phases includes 8 elements or quantization states, among which one specific quantization state may be represented by using 3 bits. For example, the index number of one quantization state may be represented by using 3 bits to report the quantization state of the phase value. The quantization state set 2, 3, or 4 of the phases includes 4 elements or quantization states, among which one specific quantization state may be represented by using 2 bits. For example, the index number of one quantization state may be represented by using 2 bits to report the quantization state of the phase value. The quantization state set 5 of the phases includes 2 elements or quantization states, among which one specific quantization state may be represented by using 1 bit. For example, the index number of one quantization state may be represented by using 1 bit to report the quantization state of the phase value.

In a case where the second vectors include one or more vectors, the same quantization state set may be reported for all the second vectors, that is, one quantization state set that is applicable to all vectors in the second vectors is reported. For example, a quantization state set of the magnitudes that is applicable to the magnitudes of weighting coefficients of all vectors in the second vectors is reported, and a quantization state set of the phases that is applicable to the phases of weighting coefficients of all vectors in the second vectors is reported. Alternatively, a quantization state set of the magnitudes or a quantization state set of the phases is reported for each vector in the second vectors, respectively. Alternatively, the vectors in the second vectors are divided into multiple groups, each group includes one or more vectors, and a quantization state set of the magnitudes or a quantization state set of the phases is reported according to the groups, respectively; that is, one group corresponds to a quantization state set of the magnitudes or a quantization state set of the phases. The groups of the second vectors may be divided into different groups according to the power or magnitudes, and a quantization state set of the phases may be reported according to the groups, respectively.

One or more quantization state sets of the magnitudes are reported, where the one or more quantization state sets of the magnitudes are associated with a group of vectors in the second vectors, respectively, that is, at least one quantization state set of the magnitudes corresponds to a group of vectors in the second vectors, that is, this group of vectors is applicable to the corresponding quantization state sets of the magnitudes. Alternatively, one or more quantization state sets of the phases are reported, where the one or more quantization state sets of the phases are associated with a group of vectors in the second vectors, respectively, that is, at least one quantization state set of the phases corresponds to a group of vectors in the second vectors, that is, this group of vectors is applicable to the corresponding quantization state sets of the phases.

One or more quantization states of the magnitudes are reported, where the one or more quantization states of the magnitudes are associated with a group of vectors in the second vectors, respectively, that is, at least one quantization state of the magnitudes corresponds to a group of vectors in the second vectors, that is, this group of vectors is applicable to the corresponding quantization states of the magnitudes. Alternatively, one or more quantization state of the phases are reported, where the one or more quantization states of the phases are associated with a group of vectors in the second vectors, respectively, that is, at least one quantization state of the phases corresponds to a group of vectors in the second vectors, that is, this group of vectors is applicable to the corresponding quantization states of the phases.

One or more quantization states of the magnitudes are reported, where the one or more quantization states of the magnitudes are associated with a group of sub-bands in the sub-bands, respectively, that is, at least one quantization state of the magnitudes corresponds to a group of sub-bands in the sub-bands, that is, this group of sub-bands is applicable to the corresponding quantization states of the magnitudes. Alternatively, one or more quantization state of the phases are reported, where the one or more quantization states of the phases are associated with a group of sub-bands in the sub-bands, respectively, that is, at least one quantization state of the phases corresponds to a group of sub-bands in the sub-bands, that is, this group of sub-bands is applicable to the corresponding quantization states of the phases.

One or more quantization state sets of the magnitudes are reported, where the one or more quantization state sets of the magnitudes are associated with a group of sub-bands in the sub-bands, respectively, that is, at least one quantization state set of the magnitudes corresponds to a group of sub-bands in the second vectors, that is, this group of sub-bands is applicable to the corresponding quantization state sets of the magnitudes. Alternatively, one or more quantization state sets of the phases are reported, where the one or more quantization state sets of the phases are associated with a group of sub-bands in the sub-bands, respectively, that is, at least one quantization state set of the phases corresponds to a group of sub-bands in the second vectors, that is, this group of sub-bands is applicable to the corresponding quantization state sets of the phases.

In another embodiment of the present disclosure, the step in which the quantization state, reported by the first node, of the relative value of the magnitudes or the phase is received includes: receiving at least one of the following information reported by the first node: a quantization state set of the relative value of the magnitudes or the phases, a quantization state in the quantization state set, and a vector or a vector group using the quantization state in the second vectors; a quantization state set of the relative value of the magnitudes or the phases, a quantization state in the quantization state set, vectors using the quantization state set in the second vectors, and a vector, in the vectors using the quantization state set, using the quantization state; a quantization state set of the relative value of the magnitudes or the phases, a quantization state in the quantization state set, a vector group using the quantization state set in the second vectors, and a vector using the quantization state in the vector group; a quantization state of the relative value of the magnitudes or the phases, and a vector or a vector group, in the second vectors, using the quantization state of the relative value of the magnitudes or the phases; a quantization state of the relative value of the magnitudes or the phases, and a sub-band or a sub-band set using the quantization state of the relative value of the magnitudes or the phases; a quantization state set of the relative value of the magnitudes or the phases, a quantization state in the quantization state set, sub-bands using the quantization state set, and a sub-band, in the sub-bands using the quantization state set, using the quantization state; a quantization state set of the relative value of the magnitudes or the phases, a quantization state in the quantization state set, a sub-band group using the quantization state set, and a sub-band, in the sub-band group, using the quantization state; an index number of a sub-band in which a quantization state of the relative value of the magnitudes or the phases is a third preset value or a location in which the sub-band is located, where the third preset value includes 0, for example, the index number of the sub-band or the location in which the sub-band is reported, and the quantization state of the relative value of the phase of the weighting coefficient of the second vector corresponding to the sub-band is 0 by default or default is 0, in another example, the index number of the sub-band or the location in which the sub-band is located is reported, and that the quantization state of the relative value of the phase of the weighting coefficient of the second vector corresponding to the sub-band is 0 is reported, and in this manner, that the quantization state is 0 is not reported or that the quantization states corresponding to multiple sub-bands are 0 is reported only once, thereby saving the overhead; or an index number of a sub-band in which a quantization state of the relative value of the magnitudes or the phases remains unchanged or a location in which the sub-band is located, where for example, the index number of the sub-band or the location in which the sub-band is reported, and the quantization state of the relative value of the phase of the weighting coefficient of the second vector corresponding to the sub-band remains unchanged by default or default is remaining unchanged, in another example, the index number of the sub-band or the location in which the sub-band is located is reported, and that the quantization state of the relative value of the phase of the weighting coefficient of the second vector corresponding to the sub-band remains unchanged is reported, and in this manner, the quantization state is not reported or that the quantization states corresponding to multiple sub-bands remain unchanged is reported only once, thereby saving the overhead. The method further includes: determining, according to any one of the above information reported by the first node, the quantization state of the relative value of the magnitudes or the phases.

In this embodiment of the present disclosure, the reporting of the quantization state of the relative value of the phases or the magnitudes of the weighting coefficient is to select an element from a quantization state set having a limited number of elements as the relative value of the phases or the relative value of the magnitudes of the weighting coefficient. The reported content may be the index number of the element in the quantization state set or the location of the element in the quantization state set. One element in the quantization state set is one quantization state, and a selected element is a quantization state corresponding to the relative value of a phase or a magnitude. For example, an element is selected from the quantization state set $$\left\{1, \frac{\sqrt{2}}{2}\right\}$$

for the relative value of the magnitude value and then the reporting is performed, or an element is selected from the quantization state set $$\left\{0, \frac{\pi}{2}\right\}$$

for the relative value of the phase value and then the reporting is performed.

There may be multiple quantization state sets, and the first node reports the used or selected quantization state sets, thereby facilitating the adaptation to the channel state, saving the reporting resource overhead, and improving the reporting precision. For example, the multiple quantization state sets may be predefined or negotiated, and the first node reports the selected or used quantization state sets. For example, there are examples of quantization state sets of the magnitudes in Tables 13 and 14.

As shown in Tables 13 and 14, the quantization state set 1 of the relative value of the magnitudes includes 4 elements or quantization states, among which one specific quantization state may be represented by using 2 bits. For example, the index number of one quantization state is represented by using 2 bits to report the quantization state of the relative value of the magnitude. The quantization state set 2 of the relative value of the magnitudes includes 2 elements or quantization states, among which one specific quantization state may be represented by using 1 bit. For example, the index number of one quantization state is represented by using 1 bit to report the quantization state of the relative value of the magnitude.

There are examples of quantization state sets of the relative value of the phases in Tables 15 to 25.

As shown in Tables 15 to 25, the quantization state sets 1, 2, 3, and 4 of the relative value of the phases each includes 4 elements or quantization states, among which one specific quantization state may be represented by using 2 bits. For example, the index number of one quantization state may be represented by using 2 bits to report the quantization state of the relative value of the phase. The quantization state sets 5, 6, 7, 8, 9, 10, and 11 of the relative value of the phases each includes 2 elements or quantization states, among which one specific quantization state may be represented by using 1 bit. For example, the index number of one quantization state may be represented by using 1 bit to report the quantization state of the relative value of the phase.

In a case where the second vectors include one or more vectors, the same relative value quantization state set may be reported for all the second vectors, that is, one relative value quantization state set that is applicable to all vectors in the second vectors is reported. For example, a relative value quantization state set of the magnitudes, which is applicable to the magnitudes of weighting coefficients of all vectors in the second vectors, is reported, and a relative value quantization state set of the phases, which is applicable to the phases of weighting coefficients of all vectors in the second vectors, is reported. Alternatively, a relative value quantization state set of the magnitudes or a relative value quantization state set of the phases is reported for each vector in the second vectors, respectively. Alternatively, the vectors in the second vectors are divided into multiple groups, each group includes one or more vectors, and a relative value quantization state set of the magnitudes or a relative value quantization state set of the phases is reported according to the groups, respectively; that is, one group corresponds to a relative value quantization state set of the magnitudes or a relative value quantization state set of the phases. The groups of the second vectors may be divided into different groups according to the power or magnitudes, and a quantization state set of the phases may be reported according to the groups, respectively.

One or more quantization state sets of the relative value of the magnitudes are reported, where the one or more quantization state sets of the relative value of the magnitudes are associated with a group of vectors in the second vectors, respectively, that is, at least one quantization state set of the relative value of the magnitudes corresponds to a group of vectors in the second vectors, that is, this group of vectors is applicable to the corresponding quantization state sets of the relative value of the magnitudes. Alternatively, one or more quantization state sets of the relative value of the phases are reported, where the one or more quantization state sets of the relative value of the phases are associated with a group of vectors in the second vectors, respectively, that is, at least one quantization state set of the relative value of the phases corresponds to a group of vectors in the second vectors, that is, this group of vectors is applicable to the corresponding quantization state sets of the relative value of the phases.

One or more relative value quantization states of the magnitudes are reported, where the one or more relative value quantization states of the magnitudes are associated with a group of vectors in the second vectors, respectively, that is, at least one relative value quantization state of the magnitudes corresponds to a group of vectors in the second vectors, that is, this group of vectors is applicable to the corresponding relative value quantization states of the magnitudes. Alternatively, one or more relative value quantization states of the phases are reported, where the one or more relative value quantization states of the phases are associated with a group of vectors in the second vectors, respectively, that is, at least one relative value quantization state of the phases corresponds to a group of vectors in the second vectors, that is, this group of vectors is applicable to the corresponding relative value quantization states of the phases.

One or more relative value quantization states of the magnitudes are reported, where the one or more relative value quantization states of the magnitudes are associated with a group of sub-bands in the sub-bands, respectively, that is, at least one relative value quantization state of the magnitudes corresponds to a group of sub-bands in the sub-bands, that is, this group of sub-bands is applicable to the corresponding relative value quantization states of the magnitudes. Alternatively, one or more relative value quantization states of the phases are reported, where the one or more relative value quantization states of the phases are associated with a group of sub-bands in the sub-bands, respectively, that is, at least one relative value quantization state of the phases corresponds to a group of sub-bands in the sub-bands, that is, this group of sub-bands is applicable to the corresponding relative value quantization states of the phases.

One or more quantization state sets of the relative value of the magnitudes are reported, where the one or more quantization state sets of the relative value of the magnitudes are associated with a group of sub-bands in the sub-bands, respectively, that is, at least one quantization state set of the relative value of the magnitudes corresponds to a group of sub-bands in the second vectors, that is, this group of sub-bands is applicable to the corresponding quantization state sets of the relative value of the magnitudes. Alternatively, one or more quantization state sets of the relative value of the phases are reported, where the one or more quantization state sets of the relative value of the phases are associated with a group of sub-bands in the sub-bands, respectively, that is, at least one quantization state set of the relative value of the phases corresponds to a group of sub-bands in the second vectors, that is, this group of sub-bands is applicable to the corresponding quantization state sets of the relative value of the phases.

In another embodiment of the present disclosure, the quantization state set of the relative value of the magnitudes or the phases is determined according to the magnitudes of the second vectors. For example, the quantization state set adopted by each vector is determined according to the order of the magnitude of each vector in the second vectors. For example, the quantization state set adopted by each vector is determined according to the magnitude relationship between the magnitudes of the second vectors and a threshold value.

In another embodiment of the present disclosure, the quantization state set is reported through at least one of the following information: an index number of the quantization state set; a name of the quantization state set; the number of bits used for representing information of the quantization state in the quantization state set; or the number of bits used in the information of an element in the quantization state set.

That is, the quantization state set can be reported by reporting the index number of the quantization state set or the name of the quantization state set. When the numbers of elements included in several negotiated or predefined quantization sets are different, or when the numbers of bits used for representing information of the quantization state are different, the adopted quantization state set can also be indicated by reporting the number of bits used for representing information of the quantization state.

When there are many elements in a quantization state set of the magnitudes and the distribution range of these elements is wide, the quantization state set of the magnitudes is applicable to reporting magnitude values whose distribution variation range is large and balanced. For example, the quantization state sets 2, 3, and 4 of the magnitudes each include 4 elements, but the distribution ranges of the elements in each set are different, and thus these sets are applicable to reporting magnitude values that conform to the respective distribution variation ranges of these elements. The quantization state set 5 of the magnitudes includes 2 elements or quantization states, and the distribution range of these elements is small, and thus this set is applicable to reporting magnitude values corresponding to the distribution characteristics of these elements with small bit overhead. The first node can select the used quantization state set according to the characteristics of the magnitude values to be reported, precision requirements and overhead requirements and perform the reporting, to save the overhead and improve the reporting precision.

When there are many elements in a quantization state set of the phases and the distribution range of these elements is wide, this quantization state set of the phases is applicable to reporting phase values whose distribution variation range is large and balanced. For example, the quantization state sets 2, 3, and 4 of the phases each include 4 elements, but the distribution ranges of these elements in each set are different, and thus these sets are applicable to reporting phase values that conform to their respective distribution characteristics of these elements. The quantization state set 5 of the phases includes 2 elements or quantization states, and the distribution range of these elements is small, and thus this set is applicable to reporting phase values corresponding to the distribution characteristics of these elements with small bit overhead. The first node can select the used quantization state set according to the characteristics of the phase values to be reported, precision requirements and overhead requirements and perform the reporting, to save the overhead and improve the reporting precision.

When there are many elements in the quantization state set 1 of the relative value of the magnitudes and the distribution range of these elements is wide, this set is applicable to reporting the relative value of magnitude values whose distribution variation range is large and balanced. The quantization state set 2 of the relative value of the magnitudes includes 2 elements or quantization states, the distribution range of these elements is small, and thus this set is applicable to reporting the relative value of the magnitudes corresponding to the distribution characteristics of these elements with small bit overhead. The first node can select the used quantization state set according to the characteristics of the relative value of the magnitudes to be reported, precision requirements and overhead requirements and perform the reporting, to save the overhead and improve the reporting precision.

There are many elements in the quantization state sets 1, 2, 3, and 4 of the relative value of the phases, the distribution range of these elements is large, and thus these sets are applicable to reporting the relative value of phase values whose distribution variation range is large and balanced. The quantization state sets 5, 6, 7, 8, 9, 10, and 11 of the relative value of the phases each includes 2 elements or quantization states, the distribution range of these elements is small, and thus these sets are applicable to reporting the relative value of the phases corresponding to the distribution characteristics of these elements with small bit overhead. The first node can select the used quantization state set according to the characteristics of the relative value of the phases to be reported, precision requirements and overhead requirements and perform the reporting, to save the overhead and improve the reporting precision.

In another embodiment of the present disclosure, the step in which the number of bits is received includes: receiving any one of the following information in any one of the manners described below.

In a first manner, reported frequency domain sub-bands are divided into M sets and the number of bits of each of the M sets is reported.

For example, the reported frequency domain sub-bands are divided into M sets, and the number of bits of the phases of the weighting coefficients of each set or the number of bits of the relative value of the phases of the weighting coefficients of each set is reported. In another example, the number of bits of the magnitudes of the weighting coefficients of each set or the number of bits of the relative value of the magnitudes of the weighting coefficients of each set is reported. In another example, the reported frequency domain sub-bands are divided into M sets, and the number of bits of the phases of the weighting coefficients of each set and the number of bits of the magnitudes of the weighting coefficients of each set are reported or the number of bits of the relative value of the phases of the weighting coefficients of each set and the number of bits of the relative value of the weighting coefficients of each set are reported.

In a second manner, the number of bits of the weighting coefficients and the number of bits of relative values of the weighting coefficients are reported, respectively.

For example, the number of bits of the phases of the weighting coefficients and the number of bits of the relative value of the phases of the weighting coefficients are set or reported, respectively. In another example, the number of bits of the magnitudes of the weighting coefficients or the number of bits of the relative value of the magnitudes of the weighting coefficients are set or reported, respectively. In another example, the number of bits of the phases of the weighting coefficients, the number of bits of the magnitudes of the weighting coefficients, the number of bits of the relative value of the phases of the weighting coefficients, and the number of bits of the relative value of the magnitudes of the weighting coefficients are set or reported, respectively.

In a third manner, the number of bits is reported according to a layer on a space domain in which the first vector is located.

For example, the number of bits of the phases of the weighting coefficients of the second vectors and the number of bits of the relative value of the phases of the weighting coefficients are reported according to the layer on the space domain in which the first vector is located. In another example, the number of bits of the magnitudes of the weighting coefficients of the second vectors or the number of bits of the relative value of the magnitudes of the weighting coefficients is reported according to the layer on the space domain in which the first vector is located. In another example, the number of bits of the phases of the weighting coefficients of the second vectors, the number of bits of the magnitudes of the weighting coefficients of the second vectors, the number of bits of the relative value of the phases of the weighting coefficients, and the number of bits of the relative value of the magnitudes of the weighting coefficients are reported according to the layer on the space domain in which the first vector is located.

In a fourth manner, the number of bits is reported according to the number of the second vectors in a layer on a space domain in which the first vector is located.

For example, the number of bits of the phases of the weighting coefficients of the second vectors and the number of bits of the relative value of the phases of the weighting coefficients are reported according to the number of the second vectors in the layer on the space domain in which the first vector is located. In another example, the number of bits of the magnitudes of the weighting coefficients of the second vectors or the number of bits of the relative value of the magnitudes of the weighting coefficients is reported according to the number of the second vectors in the layer on the space domain in which the first vector is located. In another example, the number of bits of the phases of the weighting coefficients of the second vectors, the number of bits of the magnitudes of the weighting coefficients of the second vectors, the number of bits of the relative value of the phases of the weighting coefficients, and the number of bits of the relative value of the magnitudes of the weighting coefficients are reported according to the number of the second vectors in the layer on the space domain in which the first vector is located. For example, the space domain in which the first vector is located has two layers, the number of bits in all these two layers is N, the number of the second vectors in all these two layers is K, and the number of bits used by each of the second vectors is N divided by K.

For example, the number of bits of the phases of the weighting coefficients of the second vectors and the number of bits of the relative value of the phases of the weighting coefficients are reported according to the number of the second vectors in each layer on the space domain in which the first vector is located. In another example, the number of bits of the magnitudes of the weighting coefficients of the second vectors or the number of bits of the relative value of the magnitudes of the weighting coefficients is reported according to the number of the second vectors in each layer on the space domain in which the first vector is located. In another example, the number of bits of the phases of the weighting coefficients of the second vectors, the number of bits of the magnitudes of the weighting coefficients of the second vectors, the number of bits of the relative value of the phases of the weighting coefficients, and the number of bits of the relative value of the magnitudes of the weighting coefficients are reported according to the number of the second vectors in each layer on the space domain in which the first vector is located. For example, the space domain in which the first vector is located has two layers, the number of bits in a first layer is N1, the number of the second vectors in the first layer is K1, and the number of bits used by each of the second vectors in the first layer is N1 divided by K1. The number of bits in a second layer is N2, the number of the second vectors in the second layer is K2, and the number of bits used by each of the second vectors in the second layer is N2 divided by K2.

The method further includes: determining, according to the any one of information, the number of bits.

In another embodiment of the present disclosure, the number of bits is used for indicating at least one of the characteristics of the first vector: the number of sub-bands corresponding to the first vector; the number of the second vectors; or whether to report a relative value of the weighting coefficients of the second vectors.

In this embodiment of the present disclosure, the second node configures some sub-bands, and the first node is expected to report a first vector for these configured sub-bands. The first node only reports a first vector on some sub-bands in the configured sub-bands, and the first node reports the number of bits used for reporting channel state information or the number of bits used for reporting information of the first vector to indicate the number of sub-bands corresponding to the reported first vector, thereby saving the overhead, where the channel state information includes the first vector. For example, the number of bits used for reporting the channel state information or the number of bits used for reporting the information of the first vector has a functional relationship with the number of sub-bands corresponding to the reported first vector, and the number of sub-bands corresponding to the reported first vector is indicated by the number of bits used for reporting the information of the channel state information or the number of bits used for reporting the information of the first vector according to the functional relationship. In another example, the number of bits used for reporting the information of the channel state information or the number of bits used for reporting the information of the first vector has a one-to-one correspondence with the number of sub-bands corresponding to the reported first vector, and the number of sub-bands corresponding to the reported first vector is indicated by the number of bits used for reporting information of the channel state information or the number of bits used for reporting the information of the first vector according to this correspondence. In another example, the number of bits used for reporting the information of the channel state information or the number of bits used for reporting the information of the first vector has a determination relationship with the number of sub-bands corresponding to the reported first vector, that is, any one of available numbers of bits used for reporting the information of the channel state information or numbers of bits used for reporting the information of the first vector determines one number of sub-bands corresponding to the reported first vector, and the number of sub-bands corresponding to the reported first vector is indicated by the number of bits used for reporting the information of the channel state information or the number of bits used for reporting the information of the first vector according to this determination relationship.

It is to be noted additionally that the second node configures the number of second vectors that can be reported, and the first node is expected to report the configured number of second vectors or the weighting coefficients of the configured number of second vectors. The first node only reports some second vectors of the configured number of second vectors or the weighting coefficients of these second vectors, and the first node reports the number of bits used for reporting information of channel state information or the number of bits used for reporting the information of the first vector to indicate the number of reported second vectors, thereby saving the overhead, where the channel state information includes the first vector. For example, the number of bits used for reporting the information of the channel state information or the number of bits used for reporting the information of the first vector has a functional relationship with the number of the reported second vectors, and the number of the reported second vectors is indicated by the number of bits used for reporting the information of the channel state information or the number of bits used for reporting the information of the first vector according to the functional relationship. In another example, the number of bits used for reporting the information of the channel state information or the number of bits used for reporting the information of the first vector has a one-to-one correspondence with the number of the reported second vectors, and the number of the reported second vectors is indicated by the number of bits used for reporting the information of the channel state information or the number of bits used for reporting the information of the first vector according to this correspondence. In another example, the number of bits used for reporting the information of the channel state information or the number of bits used for reporting the information of the first vector has a determination relationship with the number of the reported second vectors, that is, any one of available numbers of bits used for reporting the information of the channel state information or numbers of bits used for reporting the information of the first vector determines one number of the reported second vectors, and the number of reported second vectors is indicated by the number of bits used for reporting the information of the channel state information or the number of bits used for reporting the information of the first vector according to this determination relationship.

It is to be additionally noted that the first node may determine whether to report the weighting coefficients of the second vectors in the form of relative values. The first node reports the number of bits used for reporting the information of the channel state information or the number of bits used for reporting the information of the first vector to indicate whether to report the relative values of the weighting coefficients of the second vectors, thereby saving the overhead, where the channel state information includes the first vector. For example, the number of bits used for reporting the information of the channel state information or the number of bits used for reporting the information of the first vector has a functional relationship with whether to report the relative values of the weighting coefficients of the second vectors, and whether to report the relative values of the weighting coefficients of the second vectors is indicated by the number of bits used for reporting the information of the channel state information or the number of bits used for reporting the information of the first vector according to the functional relationship. For another example, the number of bits used for reporting the information of the channel state information or the number of bits used for reporting the information of the first vector has a determination relationship with whether to report the relative values of the weighting coefficients of the second vectors, that is, any one of available numbers of bits used for reporting the information of the channel state information or numbers of bits used for reporting the information of the first vector determines whether to report the relative values of the weighting coefficients of the second vectors, and whether to report the relative values of the weighting coefficients of the second vectors is indicated by the number of bits used for reporting the information of the channel state information or the number of bits used for reporting the information of the first vector according to this determination relationship.

In another embodiment of the present disclosure, a quantization granularity of the quantization state of the relative value of the magnitudes or the phases is the same as a granularity of the quantization state of the magnitudes or the phases; or the quantization granularity of the quantization state of the relative value of the magnitudes or the phases is different from the granularity of the quantization state of the magnitudes or the phases.

The quantization granularity refers to the minimum absolute value of the difference between any two elements in the quantization state set. For example, the granularity of the quantization state set shown in Table 8 is $$\frac{\pi}{4},$$

the granularity of the quantization state set shown in Table 9 is $$\frac{\pi}{2},$$

and the granularity of the quantization state set shown in Table 12 is $\pi$.

The quantization granularity of the relative value of the phases of the weighting coefficients adopts the quantization granularity of the phase value of the weighting coefficients. For example, the quantization state set of the phase value of the weighting coefficients is the quantization state set shown in Table 8, whose granularity is $$\frac{\pi}{4},$$

and then the quantization granularity of the relative value of the phases of the weighting coefficients is also $$\frac{\pi}{4},$$

and the quantization state set of the relative value of the phases of the weighting coefficients is the quantization state set shown in Table 21 or Table 22.

In another example, the quantization state set of the phase values of the weighting coefficients is the quantization state set shown in Table 9, whose granularity is $$\frac{\pi}{2},$$

and then the quantization granularity of the relative value of the phases of the weighting coefficients is also $$\frac{\pi}{2},$$

and the quantization state set of the relative value of the phases of the weighting coefficients is the quantization state set shown in Table 19 or Table 20.

In another embodiment of the present disclosure, the step in which the quantization state set of the relative value of the magnitudes or the phases is received includes: receiving at least one of the following information: a quantization state set of the magnitudes or the phases; an index number or location of a frequency domain sub-band of the magnitudes or the phases; a quantization state of the magnitudes or the phases; or a preset quantization state set and/or a preset bias value. The method further includes: determining, according to any one of the above information, the quantization state set of the relative value of the magnitudes or the phases.

In this embodiment of the present disclosure, channel attributes between sub-bands have a correlation, and since the dynamic range of the relative value of the weighting coefficients of the second vectors between sub-bands is smaller than the dynamic range of the values of the weighting coefficients of the second vectors on the sub-bands, the quantization state of the relative value with the small dynamic range is fed back, thereby saving the overhead. The reporting of the quantization state of the phases or the magnitudes of the weighting coefficient is to select an element from a quantization state set having a limited number of elements as the phase or the magnitude of the weighting coefficient. The reported content may be the index number of the element in the quantization state set or the location of the element in the quantization state set. One element in the quantization state set is one quantization state, and a selected element is a quantization state corresponding to a phase or a magnitude. There may be multiple quantization state sets of the weighting coefficients, and the first node reports the used or selected quantization state sets, thereby facilitating the adaptation to the channel state, saving the reporting resource overhead, and improving the reporting precision. For example, the multiple quantization state sets may be predefined or negotiated, and the first node reports the selected or used quantization state sets.

In one solution, the quantization state sets of the relative values of the weighting coefficients are indicated by using the reported quantization state sets of the values of the used weighting coefficients. For example, a quantization state set of the relative value of the magnitudes is indicated by using a quantization state set of the magnitudes, or a quantization state set of the relative value of the phases is indicated by using a quantization state set of the phases.

The correspondence between the quantization state sets of the weighting coefficients and the quantization state sets of the relative values of the weighting coefficients can be determined in advance by the protocol or negotiated in advance by the first node and the second node. The correspondence may be the correspondence between the index numbers of the quantization state sets of the weighting coefficients and the index numbers of the quantization state sets of the relative values of the weighting coefficients, may also be the correspondence between the number of elements included in the quantization state sets of the weighting coefficients and the number of elements included in the quantization state sets of the relative values of the weighting coefficients, may also be the correspondence between the numbers of bits used for reporting the elements in the quantization state sets of the weighting coefficients and the number of bits used for reporting the elements in the quantization state sets of the relative values of the weighting coefficients, and may also be the correspondence between at least one of the following characteristics of the quantization state sets of the weighting coefficients and at least one of the following characteristics of the quantization state sets of the relative values of the weighting coefficients: a quantization state set index number; the number of elements included in the quantization state set; or the number of bits used for reporting the elements in the quantization state set.

In another solution, the values of the weighting coefficients of the second vectors are reported by using one or more sub-bands, that is, the direct values instead of the relative values are reported, while the relative values of the weighting coefficients of the second vectors are reported for other sub-bands. The quantization state sets used for reporting the relative values of the weighting coefficients of the second vectors are indicated by the index numbers or locations of the sub-bands corresponding to the direct values of the weighting coefficients of the second vectors. For example, the index numbers or locations of the sub-bands are associated with the index numbers of the quantization state sets of the relative values of the weighting coefficients; or the index numbers or locations of the sub-bands are associated with the numbers of elements included in the quantization state sets of the relative values of the weighting coefficients; or the index numbers or locations of the sub-bands are associated with the numbers of bits used for reporting the elements in the quantization state sets of the relative values of the weighting coefficients. The quantization state sets of the relative values of the weighting coefficients having corresponding characteristics are indicated by reporting the index numbers or locations of the sub-bands corresponding to the direct values of the weighting coefficients of the second vectors.

In another solution, for example, the correspondence between the quantization state sets of the weighting coefficients and the quantization state sets of the relative values of the weighting coefficients is established, and the quantization state sets of the relative values of the weighting coefficients are indicated by the quantization states of the values of the weighting coefficients. In another example, the correspondence between sequences of the quantization states of the values of the weighting coefficients in a quantization state set to which each of these quantization states belongs and the quantization state sets of the relative values of the weighting coefficients is established, and the quantization state sets of the relative values of the weighting coefficients are indicated by the quantization states of the values of the weighting coefficients. In another example, elements having smaller values in the quantization state sets of the weighting coefficients are associated with quantization state sets, in which quantization states need to be reported by using smaller numbers of bits, of the relative values of the weighting coefficients, and elements having larger values in the quantization state sets of the weighting coefficients are associated with quantization state sets, in which quantization states need to be reported by using larger numbers of bits, of the relative values of the weighting coefficients.

In another solution, for example, one predetermined quantization state set and one predetermined bias value are reported, and the elements in the quantization state set of the relative value are the sum of elements in the reported predetermined quantization state set and the reported predetermined bias value. For example, if the reported predetermined quantization state set is the quantization state set shown in Table 15, the reported predetermined bias value is $$-\frac{\pi}{4},$$

and the quantization state set of the relative value is the quantization state set shown in Table 17.

In another example, the reported predetermined quantization state set is the quantization state set shown in Table 16, the reported predetermined bias value is $$\frac{\pi}{4},$$

and then the quantization state set of relative value is the quantization state set shown in Table 18.

In another embodiment of the present disclosure, the quantization state set of the phases or the quantization state set of the relative value of the phases has at least one of the following characteristics: a negative phase element is included; a negative phase element and a positive phase element are included; the number of negative phase elements included is greater than the number of positive phase elements; or the number of negative phase elements included is less than the number of positive phase elements.

In this embodiment of the present disclosure, according to the channel state, sets with different quantization state distributions are used, thereby saving the overhead and improving the feedback precision. For example, there are the quantization state sets shown in Table 15, Table 16, Table 17, Table 18, Table 19, Table 20, Table 21, Table 22, Table 23, Table 24, and Table 25, where the quantization state sets shown in Tables 16, 17, 18, 20, 22, and 24 include negative phase elements, and the quantization state sets shown in Tables 17 and 18 include both negative phase elements and positive phase elements, where negative phase elements included in the quantization state set shown in Table 18 is more than positive phase elements, and negative phase elements included in the quantization state set shown in Table 17 is less than positive phase elements.

In another embodiment of the present disclosure, the step in which the vectors of which elements have the one-to-one correspondence with the reported frequency domain sub-bands are received includes: receiving any one of the following vectors: consecutive orthogonal vectors numbered at equal intervals in candidate codebook vectors, where for example, the candidate codebook C is one vector set in which elements are vectors $c_k$, where k is a sequence number of an element and values 0, 1, 2, . . . , and N, the second vectors include a group of vectors from the candidate codebook C, for example, $c_{k_0}, c_{k_1}, \ldots c_{k_i}, c_{k_{i+1}}, \ldots, c_{k_M}$, every two vectors in this group of vectors are orthogonal with each other, and $k_1-k_0=k_2-k_1=\ldots=k_{i+1}-k_i=\ldots=k_M-k_{M-1}$, where $k_0, k_1, k_2, k_i, k_{i+1}, \ldots,$ and $k_M$ are sequence numbers of elements in the candidate codebook C; a vector in the vectors of which elements have the one-to-one correspondence with the reported frequency domain sub-bands; or a vector in the candidate codebook vectors. The method further includes: determining, according to any one of the above received vectors, the vectors of which elements have the one-to-one correspondence with the reported frequency domain sub-bands.

For example, $c_k$ is one of the second vectors and comes from the candidate codebook, and by reporting the vector $c_k$, that the following group of vectors $c_k, c_{k+P}, c_{k+2P}, \ldots, c_{k+(Q-1)P}$ is a group of vectors included in the second vectors is indicated, where Q and P are positive integers. In another example, $c_k$ is one of the second vectors and comes from the candidate codebook, and by reporting the vector $c_k$, that the following group of vectors $c_{k-(Q-1)P}, \ldots, c_{k-2P}, c_{k-P}, c_k, c_{k+P}, c_{k+2P}, \ldots, c_{k+(Q-1)P}$ is a group of vectors included in the second vectors is indicated, where Q and P are positive integers.

Figure 3:
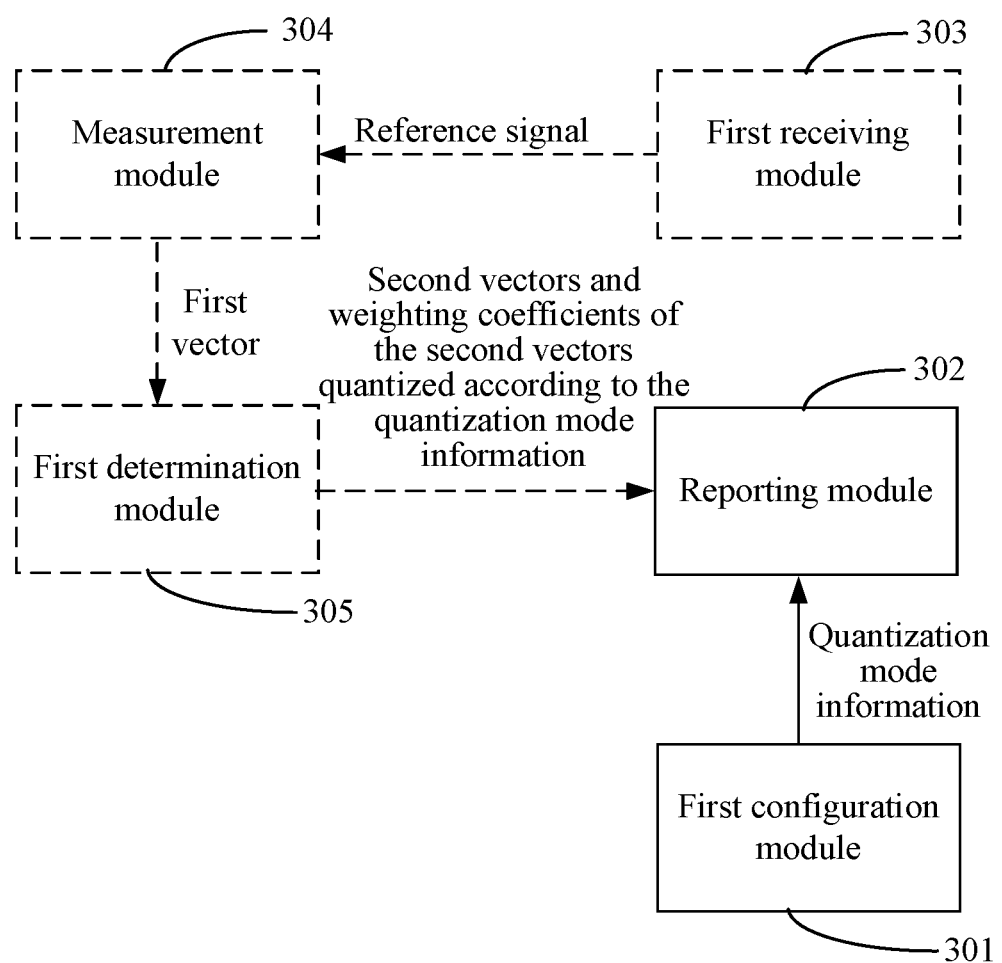
FIG. 3 is a structural diagram of a device for reporting an antenna port weighting vector according to another embodiment of the present disclosure.

With reference to FIG. 3, another embodiment of the present disclosure provides a device for reporting an antenna port weighting vector (for example, a first node). The device includes a first configuration module 301 and a reporting module 302.

The first configuration module 301 is configured to receive quantization mode information of weighting coefficients of second vectors configured by a second node, or report to a second node quantization mode information of weighting coefficients of the second vectors.

The reporting module 302 is configured to report to the second node the second vectors and weighting coefficients of the second vectors quantized according to the quantization mode information.

The quantization mode information includes information indicating a quantization state set; a first vector is an antenna port weighting vector and consists of the second vectors; and the second vectors include at least one of the following vectors: vectors of which elements have a one-to-one correspondence with antenna ports or vectors of which elements have a one-to-one correspondence with reported frequency domain sub-bands.

In another embodiment of the present disclosure, the device further includes a first receiving module 303, a measurement module 304, and a first determination module 305.

The first receiving module 303 is configured to receive a reference signal sent by the second node, where reference signals on different frequency domain sub-bands have the same location on corresponding frequency domain sub-bands.

The measurement module 304 is configured to measure a channel state by using the reference signal to obtain the first vector.

The first determination module 305 is configured to determine the second vectors and the weighting coefficients of the second vectors according to the first vector, and quantize the weighting coefficients of the second vectors according to the quantization mode information.

In another embodiment of the present disclosure, the information indicating the quantization state set includes at least one of a quantization state set index number; an element in the quantization state set; a characteristic of an element in the quantization state set; the number of quantization states included in the quantization state set; a characteristic of a quantization state included in the quantization state set; the number of bits used for reporting a quantization state in the quantization state set; direct quantization on the weighting coefficients of the second vectors; or quantization on the weighting coefficients of the second vectors by using a relative value between the different frequency domain sub-bands.

In another embodiment of the present disclosure, a weighting coefficient of a vector with the strongest power in the second vectors is a first preset value.

In another embodiment of the present disclosure, the reporting module 302 is specifically configured to report the weighting coefficients of the second vectors quantized according to the quantization mode information through at least one of the following information: a vector whose weighting coefficient is a second preset value in the second vectors; a vector whose weighting coefficient has a maximum magnitude in the second vectors; a vector with the strongest power in the second vectors; an index number of a frequency domain sub-band or a location in which the frequency domain sub-band is located, and weighting coefficients of the second vectors on the frequency domain sub-band quantized according to the quantization mode information or a relative value of the quantized weighting coefficients of the second vectors on the frequency domain sub-band; a weighting coefficient of a second vector on a frequency domain sub-band group quantized according to the quantization mode information; magnitudes of the weighting coefficients of the second vectors quantized according to the quantization mode information; or phases of the weighting coefficients of the second vectors quantized according to the quantization mode information.

In another embodiment of the present disclosure, the second preset value includes at least one of 0 or 1.

In another embodiment of the present disclosure, the reporting module 302 is specifically configured to report the vector whose weighting coefficient is the second preset value through any one of an index number of the vector whose weighting coefficient is the second preset value, a location in which the vector whose weighting coefficient is the second preset value is located, a numerical value having a mapping relationship with the index number of the vector whose weighting coefficient is the second preset value, or a numerical value having a mapping relationship with the location in which the vector whose weighting coefficient is the second preset value is located. The vector whose weighting coefficient has the maximum magnitude is reported through any one of an index number of the vector whose weighting coefficient has the maximum magnitude, a location in which the vector whose weighting coefficient has the maximum magnitude is located, a numerical value having a mapping relationship with the index number of the vector whose weighting coefficient has the maximum magnitude, or a numerical value having a mapping relationship with the location in which the vector whose weighting coefficient has the maximum magnitude is located. The vector with the strongest power is reported through any one of an index number of the vector with the strongest power, a location in which the vector with the strongest power is located, a numerical value having a mapping relationship with the index number of the vector with the strongest power, or a numerical value having a mapping relationship with the location in which the vector with the strongest power is located.

In another embodiment of the present disclosure, the reporting module 302 is specifically configured to report the magnitudes or the phases of the weighting coefficients of the second vectors quantized according to the quantization mode information through at least one of the following information: quantization states of the magnitudes or the phases, or a quantization state of a relative value of the magnitudes or the phases between the different frequency domain sub-bands.

In another embodiment of the present disclosure, a reference value of the relative value of the magnitudes or the phases includes any one of: a magnitude or a phase of a reference sub-band, or a quantization state of the magnitude or the phase of the reference sub-band.

In another embodiment of the present disclosure, the reporting module 302 is specifically configured to report the quantization states of the magnitudes or the phases through any one of the following information: a quantization state set of the magnitudes or the phases, a quantization state in the quantization state set, and a vector or a vector group using the quantization state in the second vectors; a quantization state set of the magnitudes or the phases, a quantization state in the quantization state set, vectors using the quantization state set in the second vector, and a vector, in the vectors using the quantization state set, using the quantization state; a quantization state set of the magnitudes or the phases, a quantization state in the quantization state set, a vector group using the quantization state set in the second vectors, and a vector using the quantization state in the vector group; the quantization states of the magnitudes or the phases, and a vector or a vector group, in the second vectors, using the quantization state of the magnitudes or the phases; the quantization states of the magnitudes or the phases, and a sub-band or a sub-band set using the quantization states of the magnitudes or the phases; a quantization state set of the magnitudes or the phases, a quantization state in the quantization state set, sub-bands using the quantization state set, and a sub-band, in the sub-bands using the quantization state set, using the quantization state; or a quantization state set of the magnitudes or the phases, a quantization state in the quantization state set, a sub-band group using the quantization state set, and a sub-band, in the sub-band group, using the quantization state.

In another embodiment of the present disclosure, the reporting module 302 is specifically configured to report the quantization state of the relative value of the magnitudes or the phases through any one of the following information: a quantization state set of the relative value of the magnitudes or the phases, a quantization state in the quantization state set, and a vector or a vector group using the quantization state in the second vectors; a quantization state set of the relative value of the magnitudes or the phases, a quantization state in the quantization state set, vectors using the quantization state set in the second vectors, and a vector, in the vectors using the quantization state set, using the quantization state; a quantization state set of the relative value of the magnitudes or the phases, a quantization state in the quantization state set, a vector group using the quantization state set in the second vectors, and a vector using the quantization state in the vector group; a quantization state of the relative value of the magnitudes or the phases, and a vector or a vector group, in the second vectors, using the quantization state of the relative value of the magnitudes or the phases; a quantization state of the relative value of the magnitudes or the phases, and a sub-band or a sub-band set using the quantization state of the relative value of the magnitudes or the phases; a quantization state set of the relative value of the magnitudes or the phases, a quantization state in the quantization state set, sub-bands using the quantization state set, and a sub-band, in the sub-bands using the quantization state set, using the quantization state; a quantization state set of the relative value of the magnitudes or the phases, a quantization state in the quantization state set, a sub-band group using the quantization state set, and a sub-band, in the sub-band group, using the quantization state; an index number of a sub-band in which a quantization state of the relative value of the magnitudes or the phases is a third preset value or a location in which the sub-band is located; or an index number of a sub-band in which a quantization state of the relative value of the magnitudes or the phases remains unchanged or a location in which the sub-band is located.

In another embodiment of the present disclosure, the quantization state set of the relative value of the magnitudes or the phases is determined according to the magnitudes of the second vectors.

In another embodiment of the present disclosure, the third preset value includes 0.

In another embodiment of the present disclosure, a quantization granularity of the quantization state of the relative value of the magnitudes or the phases is the same as a granularity of the quantization state of the magnitudes or the phases; or the quantization granularity of the quantization state of the relative value of the magnitudes or the phases is different from the granularity of the quantization state of the magnitudes or the phases.

In another embodiment of the present disclosure, the reporting module 302 is specifically configured to report the quantization state set of the relative value of the magnitudes or the phases through at least one of the following information: a quantization state set of the magnitudes or the phases; an index number or location of a frequency domain sub-band of the magnitudes or the phases; a quantization state of the magnitudes or the phases; or a preset quantization state set and/or a preset bias value.

In another embodiment of the present disclosure, the reporting module 302 is specifically configured to report the quantization state set through at least one of the following information: an index number of the quantization state set; a name of the quantization state set; the number of bits used for representing information of the quantization state in the quantization state set; or the number of bits used in the information of an element in the quantization state set.

In another embodiment of the present disclosure, the reporting module 302 is specifically configured to report the number of bits by using any one of the following information of: dividing reported frequency domain sub-bands into M sets and reporting the number of bits of each of the M sets; reporting the number of bits of the weighting coefficients and the number of bits of relative values of the weighting coefficients, respectively; reporting the number of bits according to a layer on a space domain in which the first vector is located; or reporting the number of bits according to the number of the second vectors in a layer on a space domain in which the first vector is located.

In another embodiment of the present disclosure, the number of bits is used for indicating at least one of the characteristics of the first vector: the number of sub-bands corresponding to the first vector; the number of the second vectors; or whether to report a relative value of the weighting coefficients of the second vectors.

In another embodiment of the present disclosure, the quantization state set of the phases or the quantization state set of the relative value of the phases has at least one of the following characteristics: a negative phase element is included; a negative phase element and a positive phase element are included; the number of negative phase elements included are greater than the number of positive phase elements; or the number of negative phase elements included are less than the number of positive phase elements.

In another embodiment of the present disclosure, the reporting module 302 is specifically configured to report the magnitudes or the phases of the weighting coefficients of the second vectors quantized according to the quantization mode information through at least one of the following information: quantization states of the magnitudes or the phases, or a quantization state of a relative value of the magnitudes or the phases between the different frequency domain sub-bands.

The specific implementation process of the device for reporting an antenna port weighting vector is the same as the specific implementation process of the method for reporting an antenna port weighting vector in the above-mentioned embodiments. The details are not repeated here.

Figure 4:
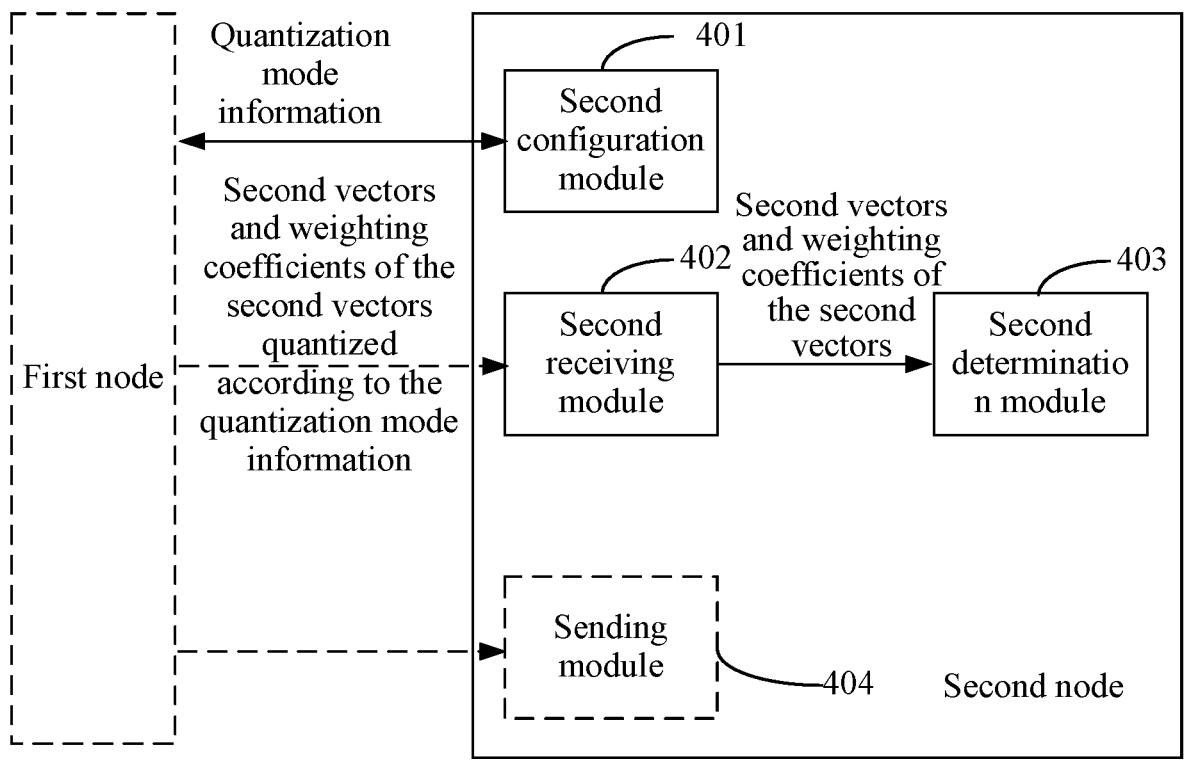
FIG. 4 is a structural diagram of a device for acquiring an antenna port weighting vector according to another embodiment of the present disclosure.

With reference to FIG. 4, another embodiment of the present disclosure provides a device for acquiring an antenna port weighting vector (for example, a second node). The device includes a second configuration module 401, a second receiving module 402, a second determination module 403, and a sending module 404.

The second configuration module 401 is configured to configure for a first node quantization mode information of weighting coefficients of second vectors, or receive quantization mode information, reported by the second node, of weighting coefficients of the second vectors; where the quantization mode information includes information indicating a quantization state set.

The second receiving module 402 is configured to receive the second vectors, reported by the first node, and weighting coefficients, reported by the first node, of the second vectors quantized according to the quantization mode information; where a first vector is an antenna port weighting vector and consists of the second vectors; and the second vectors include at least one of the following vectors: vectors of which elements have a one-to-one correspondence with antenna ports or vectors of which elements have a one-to-one correspondence with reported frequency domain sub-bands.

The second determination module 403 is configured to determine the weighting coefficients of the second vectors according to the quantization mode information and the weighting coefficients of the second vectors quantized according to the quantization mode information, and determine the first vector according to the second vectors and the weighting coefficients of the second vectors.

In this embodiment of the present disclosure, the device further includes a sending module 404.

The sending module 404 is configured to send a reference signal to the first node, where reference signals on different frequency domain sub-bands have the same location on corresponding frequency domain sub-bands.

In this embodiment of the present disclosure, the information indicating the quantization state set includes at least one of a quantization state set index number; an element in the quantization state set; a characteristic of an element in the quantization state set; the number of quantization states included in the quantization state set; a characteristic of a quantization state included in the quantization state set; the number of bits used for reporting a quantization state in the quantization state set; direct quantization on the weighting coefficients of the second vectors; or quantization on the weighting coefficients of the second vectors by using a relative value between the different frequency domain sub-bands.

In this embodiment of the present disclosure, a weighting coefficient of a vector with the strongest power in the second vectors is a first preset value.

In this embodiment of the present disclosure, the second receiving module 402 is specifically configured to receive at least one of the following information reported by the first node: a vector whose weighting coefficient is a second preset value in the second vectors; a vector whose weighting coefficient has a maximum magnitude in the second vectors; a vector with the strongest power in the second vectors; an index number of a frequency domain sub-band or a location in which the frequency domain sub-band is located, and weighting coefficients of the second vectors on the frequency domain sub-band quantized according to the quantization mode information or a relative value of the quantized weighting coefficients of the second vectors on the frequency domain sub-band; a weighting coefficient of a second vector on a frequency domain sub-band group quantized according to the quantization mode information; magnitudes of the weighting coefficients of the second vectors quantized according to the quantization mode information; or phases of the weighting coefficients of the second vectors quantized according to the quantization mode information.

The second determination module 403 is further configured to determine, according to at least one of the above information reported by the first node, the weighting coefficients of the second vectors quantized according to the quantization mode information.

In this embodiment of the present disclosure, the second preset value includes at least one of 0 or 1.

In this embodiment of the present disclosure, the second receiving module 402 is further configured to receive any one of the following information reported by the first node: an index number of the vector whose weighting coefficient is the second preset value, a location in which the vector whose weighting coefficient is the second preset value is located, a numerical value having a mapping relationship with the index number of the vector whose weighting coefficient is the second preset value, or a numerical value having a mapping relationship with the location in which the vector whose weighting coefficient is the second preset value is located.

The second determination module 403 is further configured to determine the vector whose weighting coefficient is the second preset value according to any one of the above information reported by the first node. The operation in which the vector, reported by the first node, whose weighting coefficient has the maximum magnitude is received includes: receiving any one of the following information reported by the first node: an index number of the vector whose weighting coefficient has the maximum magnitude, a location in which the vector whose weighting coefficient has the maximum magnitude is located, a numerical value having a mapping relationship with the index number of the vector whose weighting coefficient has the maximum magnitude, or a numerical value having a mapping relationship with the location in which the vector whose weighting coefficient has the maximum magnitude is located. The second determination module 403 is further configured to: determine, according to any one of the above information reported by the first node, the vector whose weighting coefficient has the maximum magnitude.

The second receiving module 402 is further configured to receive any one of the following information reported by the first node: an index number of the vector with the strongest power, a location in which the vector with the strongest power is located, a numerical value having a mapping relationship with the index number of the vector with the strongest power, or a numerical value having a mapping relationship with the location in which the vector with the strongest power is located.

The second determination module 403 is further configured to determine, according to any one of the above information reported by the first node, the vector with the strongest power.

In this embodiment of the present disclosure, the second receiving module 402 is further configured to receive at least one of the following information reported by the first node: quantization states of the magnitudes or the phases, or a quantization state of a relative value of magnitudes or the phases between the different frequency domain sub-bands.

The second determination module 403 is further configured to determine, according to any one of the above information reported by the first node, the magnitudes or the phases of the weighting coefficients of the second vectors.

In this embodiment of the present disclosure, a reference value of the relative value of the magnitudes or the phases includes any one of: a magnitude or a phase of a reference sub-band, or a quantization state of the magnitude or the phase of the reference sub-band.

In this embodiment of the present disclosure, the second receiving module 402 is further configured to receive any one of the following information reported by the first node: a quantization state set of the magnitudes or the phases, a quantization state in the quantization state set, and a vector or a vector group using the quantization state in the second vectors; a quantization state set of the magnitudes or the phases, a quantization state in the quantization state set, vectors using the quantization state set in the second vector, and a vector, in the vectors using the quantization state set, using the quantization state; a quantization state set of the magnitudes or the phases, a quantization state in the quantization state set, a vector group using the quantization state set in the second vectors, and a vector using the quantization state in the vector group; the quantization states of the magnitudes or the phases, and a vector or a vector group, in the second vectors, using the quantization state of the magnitudes or the phases; the quantization states of the magnitudes or the phases, and a sub-band or a sub-band set using the quantization states of the magnitudes or the phases; a quantization state set of the magnitudes or the phases, a quantization state in the quantization state set, sub-bands using the quantization state set, and a sub-band, in the sub-bands using the quantization state set, using the quantization state; or a quantization state set of the magnitudes or the phases, a quantization state in the quantization state set, a sub-band group using the quantization state set, and a sub-band, in the sub-band group, using the quantization state.

The second determination method 403 is further configured to determine, according to any one of the above information reported by the first node, the quantization state of the magnitudes or the phases.

In this embodiment of the present disclosure, the second receiving module 402 is further configured to receive any one of the following information reported by the first node: a quantization state set of the relative value of the magnitudes or the phases, a quantization state in the quantization state set, and a vector or a vector group using the quantization state in the second vectors; a quantization state set of the relative value of the magnitudes or the phases, a quantization state in the quantization state set, vectors using the quantization state set in the second vectors, and a vector, in the vectors using the quantization state set, using the quantization state; a quantization state set of the relative value of the magnitudes or the phases, a quantization state in the quantization state set, a vector group using the quantization state set in the second vectors, and a vector using the quantization state in the vector group; a quantization state of the relative value of the magnitudes or the phases, and a vector or a vector group, in the second vectors, using the quantization state of the relative value of the magnitudes or the phases; a quantization state of the relative value of the magnitudes or the phases, and a sub-band or a sub-band set using the quantization state of the relative value of the magnitudes or the phases; a quantization state set of the relative value of the magnitudes or the phases, a quantization state in the quantization state set, sub-bands using the quantization state set, and a sub-band, in the sub-bands using the quantization state set, using the quantization state; a quantization state set of the relative value of the magnitudes or the phases, a quantization state in the quantization state set, a sub-band group using the quantization state set, and a sub-band, in the sub-band group, using the quantization state; an index number of a sub-band in which a quantization state of the relative value of the magnitudes or the phases is a third preset value or a location in which the sub-band is located; or an index number of a sub-band in which a quantization state of the relative value of the magnitudes or the phases remains unchanged or a location in which the sub-band is located.

The second determination method 403 is further configured to determine, according to any one of the above information reported by the first node, the quantization state of the relative value of the magnitudes or the phases.

In this embodiment of the present disclosure, the quantization state set of the relative value of the magnitudes or the phases is determined according to the magnitudes of the second vectors.

In this embodiment of the present disclosure, the third preset value includes 0.

In this embodiment of the present disclosure, a quantization granularity of the quantization state of the relative value of the magnitudes or the phases is the same as a granularity of the quantization state of the magnitudes or the phases; or the quantization granularity of the quantization state of the relative value of the magnitudes or the phases is different from the granularity of the quantization state of the magnitudes or the phases.

In this embodiment of the present disclosure, the second receiving module 402 is further configured to receive at least one of the following information reported by the first node: a quantization state set of the magnitudes or the phases; an index number or location of a frequency domain sub-band of the magnitudes or the phases; a quantization state of the magnitudes or the phases; or a preset quantization state set and/or a preset bias value.

The second determination method 403 is further configured to determine, according to any one of the above information reported by the first node, the quantization state set of the relative value of the magnitudes or the phases.

In this embodiment of the present disclosure, the second receiving module 402 is further configured to receive at least one of the following information reported by the first node: an index number of the quantization state set; a name of the quantization state set; the number of bits used for representing information of the quantization state in the quantization state set; or the number of bits used in the information of an element in the quantization state set.

The second determination module 403 is further configured to determine, according to any one of the above information reported by the first node, the quantization state set.

In this embodiment of the present disclosure, the second receiving module 402 is further configured to receive any one of the following information of: dividing reported frequency domain sub-bands into M sets and reporting the number of bits of each of the M sets; reporting the number of bits of the weighting coefficients and the number of bits of relative values of the weighting coefficients, respectively; reporting the number of bits according to a layer on a space domain in which the first vector is located; or reporting the number of bits according to the number of the second vectors in a layer on a space domain in which the first vector is located.

The second determination module 403 is further configured to determine, according to any one of the above information, the number of bits.

In this embodiment of the present disclosure, the number of bits is used for indicating at least one of the characteristics of the first vector: the number of sub-bands corresponding to the first vector; the number of the second vectors; or whether to report a relative value of the weighting coefficients of the second vectors.

In this embodiment of the present disclosure, the quantization state set of the phases or the quantization state set of the relative value of the phases has at least one of the following characteristics: a negative phase element is included; a negative phase element and a positive phase element are included; the number of negative phase elements included is greater than the number of positive phase elements; or the number of negative phase elements included is less than the number of positive phase elements.

In this embodiment of the present disclosure, the second receiving module 402 is further configured to receive any one of the following vectors: consecutive orthogonal vectors numbered at equal intervals in candidate codebook vectors; a vector in the vectors of which elements have the one-to-one correspondence with the reported frequency domain sub-bands; or a vector in the candidate codebook vectors.

The second determination module 403 is further configured to determine, according to any one of the above received vectors, the vectors of which elements have the one-to-one correspondence with the reported frequency domain sub-bands.

The specific implementation process of the device for reporting an antenna port weighting vector is the same as the specific implementation process of the method for reporting an antenna port weighting vector in the above-mentioned embodiments. The details are not repeated here.

Another embodiment of the present disclosure provides an apparatus for processing an antenna port weighting vector. The apparatus includes a processor and a computer-readable storage medium, where the computer-readable storage medium is configured to store instructions which, when executed by the processor, implement any one of the methods for reporting an antenna port weighting vector or methods for acquiring an antenna port weighting vector described above.

Another embodiment of the present disclosure provides a computer-readable storage medium storing a computer program which, when executed by a processor, implements steps of any one of the methods for reporting an antenna port weighting vector or methods for acquiring an antenna port weighting vector described above.

Figure 5:
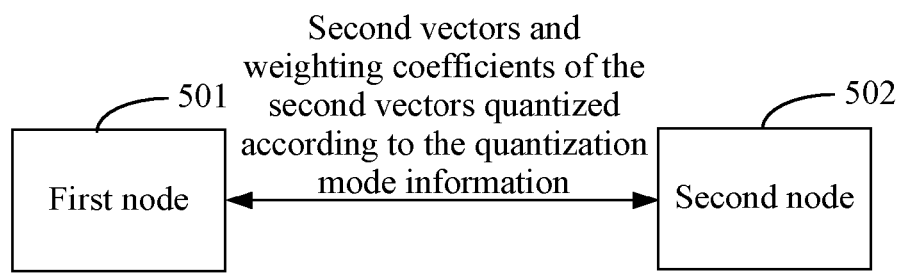
FIG. 5 is a structural diagram of a system for processing an antenna port weighting vector according to another embodiment of the present disclosure.

With reference to FIG. 5, another embodiment of the present disclosure provides a system for processing an antenna port weighting vector. The system includes a first node 501 and a second node 502.

The first node 501 is configured to: receive quantization mode information of weighting coefficients of second vectors configured by the second node, or report to a second node quantization mode information of weighting coefficients of the second vectors; and report to the second node the second vectors and weighting coefficients of the second vectors quantized according to the quantization mode information; where the quantization mode information includes information indicating a quantization state set, a first vector is an antenna port weighting vector and consists of the second vectors, and the second vectors include at least one of the following vectors: vectors of which elements have a one-to-one correspondence with antenna ports or vectors of which elements have a one-to-one correspondence with reported frequency domain sub-bands.

The second node 502 is configured to: configure for the first node quantization mode information of weighting coefficients of second vectors, or receive quantization mode information, reported by the second node, of weighting coefficients of the second vectors; receive the second vectors, reported by the first node, and weighting coefficients, reported by the first node, of the second vectors quantized according to the quantization mode information; and determine the weighting coefficients of the second vectors according to the quantization mode information and the weighting coefficients of the second vectors quantized according to the quantization mode information, and determine the first vector according to the second vectors and the quantized weighting coefficients of the second vectors.

In another embodiment of the present disclosure, the first node is further configured to: receive a reference signal sent by the second node, where reference signals on different frequency domain sub-bands have the same location on corresponding frequency domain sub-bands; measure a channel state by using the reference signal to obtain the first vector; determine the second vectors and the weighting coefficients of the second vectors according to the first vector; and quantize the weighting coefficients of the second vectors according to the quantization mode information.

The second node is further configured to send a reference signal to the first node, where reference signals on different frequency domain sub-bands have the same location on corresponding frequency domain sub-bands.

The specific implementation process of the system for reporting an antenna port weighting vector is the same as the specific implementation process of the method for reporting an antenna port weighting vector in the above-mentioned embodiments. The details are not repeated here.

It is to be understood by those of ordinary skill in the art that all or some of the steps of the preceding disclosed methods and at least one of function modules or function units in the preceding disclosed system and apparatuses may be implemented as software, firmware, hardware, or an appropriate combination thereof. In a hardware implementation, the division of the function modules/units described above does not necessarily correspond to the division of physical components. For example, one physical component may have multiple functions, or one function or step may be implemented by several physical components cooperatively. Some or all of the components may be implemented as software executed by a processor such as a digital signal processor or a microprocessor, may be implemented as hardware, or may be implemented as an integrated circuit such as an application-specific integrated circuit. Such software may be distributed over computer-readable media. The computer-readable media may include computer storage media (or non-transitory media) and communication media (or transitory media). As is known to those of ordinary skill in the art, the term computer storage media include volatile and non-volatile as well as removable and non-removable media implemented in any method or technology for storing information (such as computer-readable instructions, data structures, program modules or other data). The computer storage media include, but are not limited to, a random-access memory (RAM), a read-only memory (ROM), an electrically erasable programmable read-only memory (EEPROM), a flash memory or other memory technologies, a compact disc read-only memory (CD-ROM), a digital versatile disc (DVD) or other optical storages, a magnetic cassette, a magnetic tape, a magnetic disk or other magnetic storage devices, or any other medium for storing desired information that can be accessed by a computer. Moreover, it is known to those of ordinary skill in the art that communication media typically include computer-readable instructions, data structures, program modules or other data in modulated data signals such as carrier waves or other transport mechanisms and may include any information delivery medium.

Although the embodiments disclosed by the present disclosure are as described above, the content of the embodiments is intended only to facilitate the understanding of the present disclosure and not to limit the embodiments of the present disclosure. Any person skilled in the art to which the embodiments of the present disclosure pertains may make any modifications and changes in the form and details of implementation without departing from the spirit and scope disclosed by the embodiments of the present disclosure, but the scope of the embodiments of the present disclosure is still subject to the scope defined by the appended claims.

What is claimed is:

1. A method for reporting an antenna port weighting vector, comprising:
   receiving quantization mode information of weighting coefficients of second vectors configured by a second node, or reporting to a second node quantization mode information of weighting coefficients of the second vectors; and
   reporting to the second node the second vectors and weighting coefficients of the second vectors quantized according to the quantization mode information; wherein
   the quantization mode information comprises information indicating a quantization state set;
   a first vector is an antenna port weighting vector and consists of the second vectors; and
   the second vectors comprise at least one of the following vectors: vectors of which elements have a one-to-one correspondence with antenna ports or vectors of which elements have a one-to-one correspondence with reported frequency domain sub-bands.

2. The method of claim 1, wherein before reporting to the second node the second vectors and the quantized weighting coefficients of the second vectors, the method further comprises:
   receiving a reference signal sent by the second node, wherein reference signals on different frequency domain sub-bands have a same location on corresponding frequency domain sub-bands;
   measuring a channel state by using the reference signal to obtain the first vector;
   determining the second vectors and the weighting coefficients of the second vectors according to the first vector; and
   quantizing the weighting coefficients of the second vectors according to the quantization mode information.

3. The method of claim 1, wherein the information indicating the quantization state set comprises at least one of:
   a quantization state set index number;
   an element in the quantization state set;
   a characteristic of an element in the quantization state set;
   a number of quantization states comprised in the quantization state set;
   a characteristic of a quantization state comprised in the quantization state set;
   a number of bits used for reporting a quantization state in the quantization state set;
   direct quantization on the weighting coefficients of the second vectors; or
   quantization on the weighting coefficients of the second vectors by using a relative value between the different frequency domain sub-bands.

4. The method of claim 1, wherein a weighting coefficient of a vector with a strongest power in the second vectors is a first preset value.

5. The method of claim 1, wherein reporting to the second node the second vectors and the quantized weighting coefficients of the second vectors comprises:
   preferentially reporting, according to importance of each of the second vectors, to the second node a second vector with high importance and a weighting coefficient of the second vector with high importance quantized according to the quantization mode information.

6. The method of claim 1, wherein the quantized weighting coefficients of the second vectors are reported according to at least one of the following information:
   a vector whose weighting coefficient is a second preset value in the second vectors, wherein the second preset value comprises at least one of 0 or 1;
   a vector whose weighting coefficient has a maximum magnitude in the second vectors;
   a vector with a strongest power in the second vectors;
   an index number of a frequency domain sub-band or a location in which the frequency domain sub-band is located, and weighting coefficients of the second vectors on the frequency domain sub-band quantized according to the quantization mode information or a relative value of the quantized weighting coefficients of the second vectors on the frequency domain sub-band;
   a weighting coefficient of a second vector on a frequency domain sub-band group quantized according to the quantization mode information;
   magnitudes of the quantized weighting coefficients of the second vectors; or
   phases of the quantized weighting coefficients of the second vectors.

7. The method of claim 6, wherein
   the vector whose weighting coefficient is the second preset value is reported through any one of an index number of the vector whose weighting coefficient is the second preset value, a location in which the vector whose weighting coefficient is the second preset value is located, a numerical value having a mapping relationship with the index number of the vector whose weighting coefficient is the second preset value, or a numerical value having a mapping relationship with the location in which the vector whose weighting coefficient is the second preset value is located;

the vector whose weighting coefficient has the maximum magnitude is reported through any one of an index number of the vector whose weighting coefficient has the maximum magnitude, a location in which the vector whose weighting coefficient has the maximum magnitude is located, a numerical value having a mapping relationship with the index number of the vector whose weighting coefficient has the maximum magnitude, or a numerical value having a mapping relationship with the location in which the vector whose weighting coefficient has the maximum magnitude is located; and the vector with the strongest power is reported through any one of an index number of the vector with the strongest power, a location in which the vector with the strongest power is located, a numerical value having a mapping relationship with the index number of the vector with the strongest power, or a numerical value having a mapping relationship with the location in which the vector with the strongest power is located.

8. The method of claim 6, wherein the magnitudes or the phases of the quantized weighting coefficients of the second vectors are reported according to at least one of the following information:

quantization states of the magnitudes or the phases; or a quantization state of a relative value of magnitudes or the phases of the second vectors between the different frequency domain sub-bands;

wherein a reference value of the relative value of the magnitudes or the phases comprises any one of: a magnitude or a phase of a reference sub-band, or a quantization state of the magnitude or the phase of the reference sub-band.

9. The method of claim 8, wherein the quantization states of the magnitudes or the phases are reported through any one of the following information:

a quantization state set of the magnitudes or the phases, a quantization state in the quantization state set, and a vector or a vector group using the quantization state in the second vectors;

a quantization state set of the magnitudes or the phases, a quantization state in the quantization state set, vectors using the quantization state set in the second vector, and a vector, in the vectors using the quantization state set, using the quantization state;

a quantization state set of the magnitudes or the phases, a quantization state in the quantization state set, a vector group using the quantization state set in the second vectors, and a vector using the quantization state in the vector group;

the quantization states of the magnitudes or the phases, and a vector or a vector group, in the second vectors, using the quantization state of the magnitudes or the phases;

the quantization states of the magnitudes or the phases, and a sub-band or a sub-band set using the quantization states of the magnitudes or the phases;

a quantization state set of the magnitudes or the phases, a quantization state in the quantization state set, sub-bands using the quantization state set, and a sub-band, in the sub-bands using the quantization state set, using the quantization state; or a quantization state set of the magnitudes or the phases, a quantization state in the quantization state set, a sub-band group using the quantization state set, and a sub-band, in the sub-band group, using the quantization state.

10. The method of claim 8, wherein the quantization state of the relative value of the magnitudes or the phases is reported through any one of the following information:

a quantization state set of the relative value of the magnitudes or the phases, a quantization state in the quantization state set, and a vector or a vector group using the quantization state in the second vectors;

a quantization state set of the relative value of the magnitudes or the phases, a quantization state in the quantization state set, vectors using the quantization state set in the second vectors, and a vector, in the vectors using the quantization state set, using the quantization state;

a quantization state set of the relative value of the magnitudes or the phases, a quantization state in the quantization state set, a vector group using the quantization state set in the second vectors, and a vector using the quantization state in the vector group;

a quantization state of the relative value of the magnitudes or the phases, and a vector or a vector group, in the second vectors, using the quantization state of the relative value of the magnitudes or the phases;

a quantization state of the relative value of the magnitudes or the phases, and a sub-band or a sub-band set using the quantization state of the relative value of the magnitudes or the phases;

a quantization state set of the relative value of the magnitudes or the phases, a quantization state in the quantization state set, sub-bands using the quantization state set, and a sub-band, in the sub-bands using the quantization state set, using the quantization state;

a quantization state set of the relative value of the magnitudes or the phases, a quantization state in the quantization state set, a sub-band group using the quantization state set, and a sub-band, in the sub-band group, using the quantization state;

an index number of a sub-band in which a quantization state of the relative value of the magnitudes or the phases is a third preset value or a location in which the sub-band is located, wherein the third preset value comprises 0; or an index number of a sub-band in which a quantization state of the relative value of the magnitudes or the phases remains unchanged or a location in which the sub-band is located;

wherein the quantization state set of the relative value of the magnitudes or the phases is determined according to the magnitudes of the second vectors.

11. The method of claim 9, wherein the quantization state set is reported through at least one of the following information:

an index number of the quantization state set;

a name of the quantization state set;

a number of bits used for representing information of the quantization state in the quantization state set; or a number of bits used in information of an element in the quantization state set.

12. The method of claim 11, wherein the number of bits is reported in any one of the following manners:

dividing reported frequency domain sub-bands into M sets and reporting the number of bits of each of the M sets;

reporting a number of bits of the weighting coefficients and a number of bits of relative values of the weighting coefficients, respectively;

reporting the number of bits according to a layer on a space domain in which the first vector is located; or reporting the number of bits according to a number of the second vectors in a layer on a space domain in which the first vector is located.

13. The method of claim 1, wherein the vectors of which elements have a one-to-one correspondence with the reported frequency domain sub-bands are reported through any one of:

consecutive orthogonal vectors numbered at equal intervals in candidate codebook vectors;

a vector in the vectors of which elements have a one-to-one correspondence with reported frequency domain sub-bands; or a vector in the candidate codebook vectors.

14. A non-transitory computer-readable storage medium storing a computer program which, when executed by a processor, implements steps of the method for reporting an antenna port weighting vector or the method for acquiring an antenna port weighting vector of claim 1.

15. A method for acquiring an antenna port weighting vector, comprising:

configuring for a first node quantization mode information of weighting coefficients of second vectors, or receiving quantization mode information, reported by a second node, of weighting coefficients of the second vectors; wherein the quantization mode information comprises information indicating a quantization state set;

receiving the second vectors, reported by the first node, and weighting coefficients, reported by the first node, of the second vectors quantized according to the quantization mode information; wherein a first vector is an antenna port weighting vector and consists of the second vectors; and the second vectors comprise at least one of the following vectors: vectors of which elements have a one-to-one correspondence with antenna ports or vectors of which elements have a one-to-one correspondence with reported frequency domain sub-bands; and determining the weighting coefficients of the second vectors according to the quantization mode information and the weighting coefficients of the second vectors quantized according to the quantization mode information, and determining the first vector according to the second vectors and the quantized weighting coefficients of the second vectors.

16. The method of claim 15, wherein before receiving the second vectors, reported by the first node, and the weighting coefficients, reported by the first node, of the second vectors quantized according to the quantization mode information, the method further comprises:

sending a reference signal to the first node, wherein reference signals on different frequency domain sub-bands have a same location on corresponding frequency domain sub-bands.

17. The method of claim 15, wherein receiving the quantized weighting coefficients, of the second vectors reported by the first node comprises:

receiving at least one of the following information reported by the first node:

a vector whose weighting coefficient is a second preset value in the second vectors;

a vector whose weighting coefficient has a maximum magnitude in the second vectors;

a vector with a strongest power in the second vectors;

an index number of a frequency domain sub-band or a location in which the frequency domain sub-band is located, and weighting coefficients of the second vectors on the frequency domain sub-band quantized according to the quantization mode information or a relative value of the quantized weighting coefficients of the second vectors on the frequency domain sub-band;

a weighting coefficient of a second vector on a frequency domain sub-band group quantized according to the quantization mode information;

magnitudes of the quantized weighting coefficients of the second vectors; or phases of the quantized weighting coefficients of the second vectors; and the method further comprises: determining, according to the at least one of information reported by the first node, the weighting coefficients of the second vectors quantized according to the quantization mode information.

18. The method of claim 15, wherein receiving the vectors of which elements have the one-to-one correspondence with the reported frequency domain sub-bands comprises: receiving any one of the following vectors:

consecutive orthogonal vectors numbered at equal intervals in candidate codebook vectors;

a vector in the vectors of which elements have the one-to-one correspondence with the reported frequency domain sub-bands; or a vector in the candidate codebook vectors; and the method further comprises: determining, according to the any one of the received vectors, the vectors of which elements have the one-to-one correspondence with the reported frequency domain sub-bands.

19. A device for acquiring an antenna port weighting vector, comprising a processor and a memory for storing execution instructions that when executed by the processor cause the processor to perform steps of claim 15.

20. A device for reporting an antenna port weighting vector, comprising a a processor and a memory for storing execution instructions that when executed by the processor cause the processor to perform steps in following modules:

a first configuration module, which is configured to receive quantization mode information of weighting coefficients of second vectors configured by a second node, or report to a second node quantization mode information of weighting coefficients of the second vectors; and a reporting module, which is configured to report to the second node the second vectors and weighting coefficients of the second vectors quantized according to the quantization mode information;

wherein the quantization mode information comprises information indicating a quantization state set; a first vector is an antenna port weighting vector and consists of the second vectors; and the second vectors comprise at least one of the following vectors: vectors of which elements have a one-to-one correspondence with antenna ports or vectors of which elements have a one-to-one correspondence with reported frequency domain sub-bands.

* * * * *

UNITED STATES PATENT AND TRADEMARK OFFICE
CERTIFICATE OF CORRECTION

| | |
|---|---|
| PATENT NO. | : 11,387,885 B2 |
| APPLICATION NO. | : 17/290325 |
| DATED | : July 12, 2022 |
| INVENTOR(S) | : Yong Li et al. |

It is certified that error appears in the above-identified patent and that said Letters Patent is hereby corrected as shown below:

In the Specification

In Column 5, Line 58, delete "c(2),c(m)" and insert --c(2),...,c(m)--.

In Column 36, Line 63, delete "k2,ki" and insert --k2,...,ki--; and delete "km" and insert --kM--.

In Column 39, Line 12, delete "B(2), +c(m)×B(m), +" and insert --B(2),..., +c(m)×B(m),..., +--.

Signed and Sealed this
Third Day of January, 2023

Katherine Kelly Vidal
Director of the United States Patent and Trademark Office